United States Patent [19]

Ishii et al.

[11] Patent Number: 5,905,369

[45] Date of Patent: May 18, 1999

[54] VARIABLE FREQUENCY SWITCHING OF SYNCHRONIZED INTERLEAVED SWITCHING CONVERTERS

[75] Inventors: Takuya Ishii, Suita; Yoshio Mizutani, Tsu, both of Japan

[73] Assignee: Matsushita Electric Industrial Co., Ltd., Kadoma, Japan

[21] Appl. No.: 08/950,348

[22] Filed: Oct. 14, 1997

[30] Foreign Application Priority Data

Oct. 17, 1996 [JP] Japan ..................................... 8-274420
Nov. 6, 1996 [JP] Japan ..................................... 8-293499

[51] Int. Cl.[6] ..................................................... G05F 1/59
[52] U.S. Cl. ............................. 323/272; 323/222; 363/72
[58] Field of Search .................................... 323/222, 272; 363/72

[56] References Cited

U.S. PATENT DOCUMENTS

| | | | |
|---|---|---|---|
| 4,174,534 | 11/1979 | Kotlarewsky | 363/72 |
| 4,467,268 | 8/1984 | Chambers et al. | 323/222 |
| 4,595,873 | 6/1986 | Musil | 323/272 |
| 4,725,768 | 2/1988 | Watanabe | 323/272 |
| 5,508,903 | 4/1996 | Alexndrov | 363/16 |

FOREIGN PATENT DOCUMENTS

| | | | |
|---|---|---|---|
| 61-288780 | 12/1986 | Japan | H02M 7/48 |
| 1231661 | 9/1989 | Japan | H02M 3/28 |
| 1270769 | 10/1989 | Japan | H02M 3/28 |

*Primary Examiner*—Jeffrey Sterrett
*Attorney, Agent, or Firm*—Renner, Otto, Boisselle & Sklar, P.L.L.

[57] ABSTRACT

The interleaved switching converter circuit of the present invention includes: a first and a second switching converter which are connected in parallel to each other; a first control driver for turning ON/OFF the first switching converter; a charger/discharger having a first and a second capacitor and alternately charging/discharging the first and the second capacitors, in response to the turn ON/OFF of the first switching converter; and a second control driver for turning ON/OFF the second switching converter in synchronism with an inversion of a difference between voltages of the first and the second capacitors.

10 Claims, 18 Drawing Sheets

FIG. 6
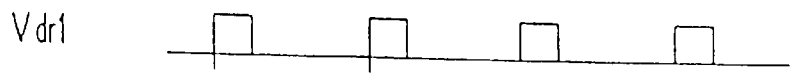
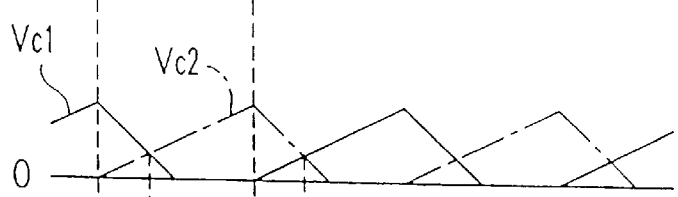
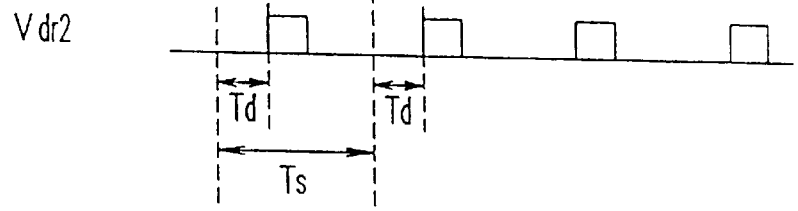
FIG. 7
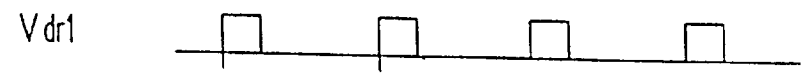
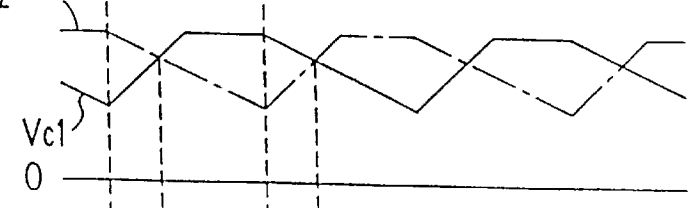
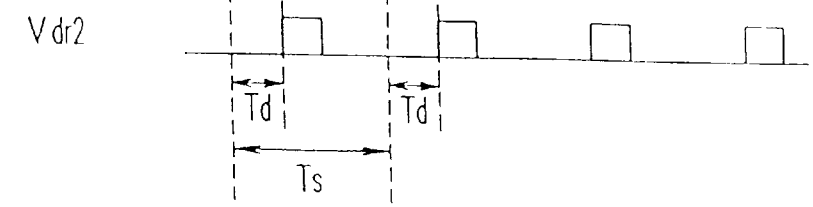

FIG.9
(a) Vdr1
(b) Vc1 Vc2
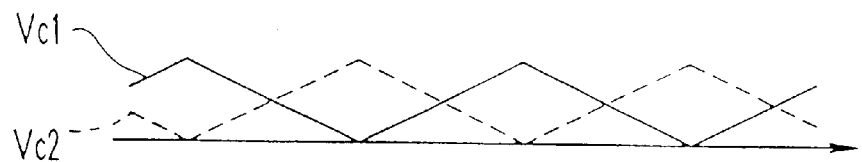
(c) Vdr2
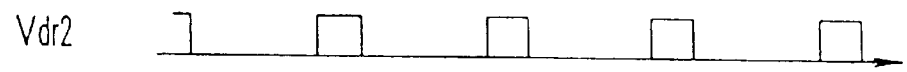
(d) Ii2 Ii1
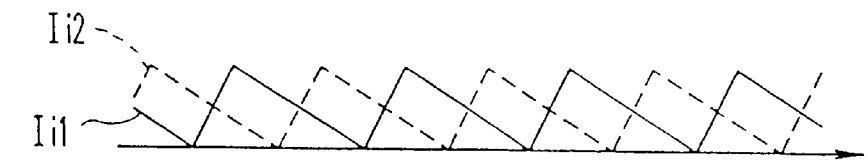
(e) Ii
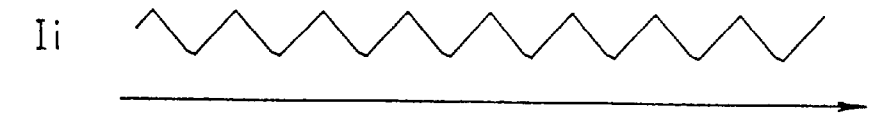
(f) Id2 Id1
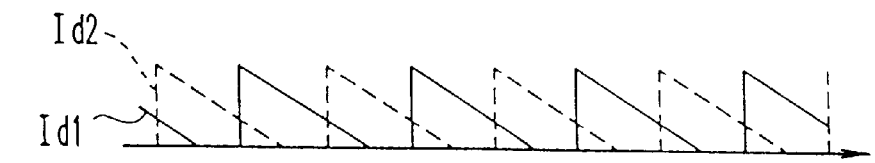
(g) Ic

FIG.10

(a) Vdr1

(b) Vc1, Vc2

(c) Vdr2

(d) Ii2, Ii1

(e) Ii (f) Id2, Id1

(g) Ic

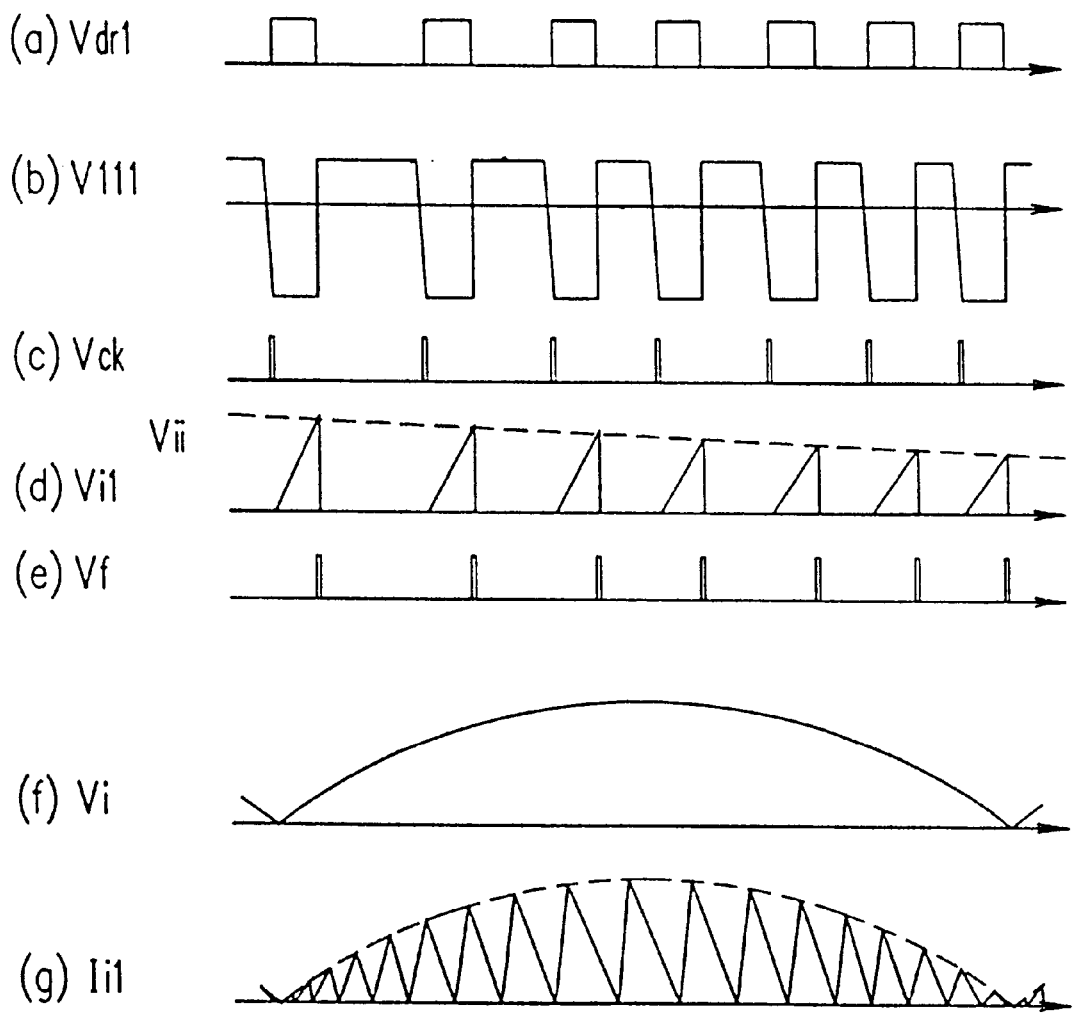

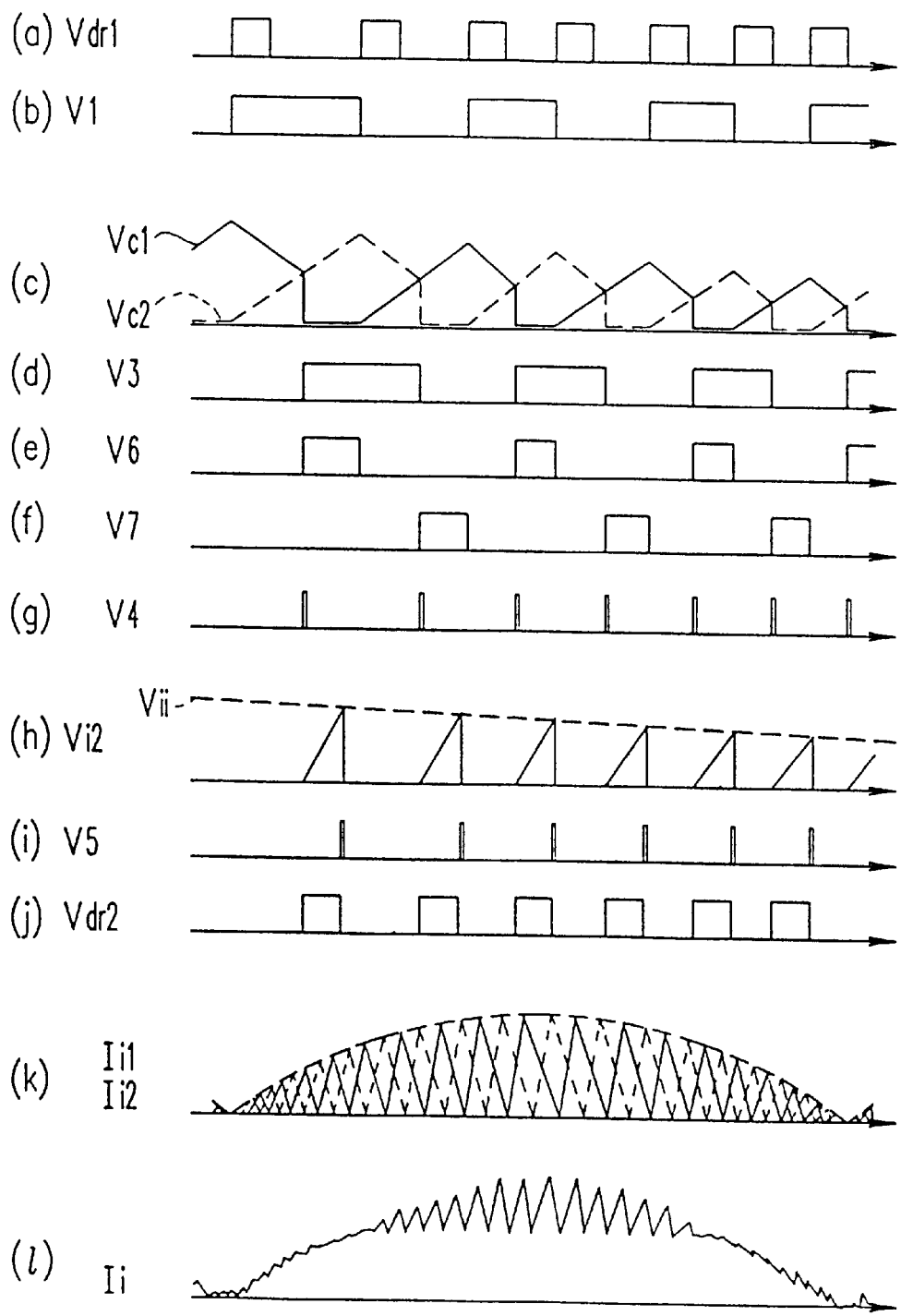

FIG.20
(a) Vdr1 
(b) 
(c) V302 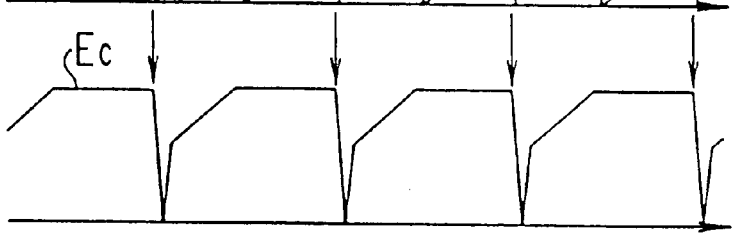
(d) V303 
(e) Vdr2 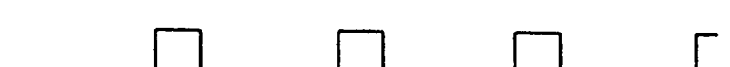

VARIABLE FREQUENCY SWITCHING OF SYNCHRONIZED INTERLEAVED SWITCHING CONVERTERS

BACKGROUND OF THE INVENTION

1. Field of the Invention

The present invention relates to a switching converter circuit applicable to various types of electronic units. More particularly, the present invention relates to an interleaved switching converter circuit in which a plurality of switching converters, connected in parallel to each other, are alternately turned ON/OFF, and to a method for controlling the switching converters.

2. Description of the Related Art

Various types of interleaved switching converter circuits are described, for example, in Japanese Laid-Open Publications Nos. 61-288780, 1-231661 and 1-270769, U.S. Pat. No. 5,508,903 and the like. In a prior art switching converter circuit, assuming that the switching converter circuit includes a number N (where N is an integer equal to or larger than 2) of switching converters, the switching converters are alternately turned ON/OFF with a phase difference of 360/N degrees. For example, if an interleaved switching converter circuit includes two switching converters (i.e., N=2), the two switching converters included therein are alternately turned ON/OFF with a phase difference of 180 degrees. Under such a configuration, the amplitude of a ripple generated in input/output current can be reduced and the frequency of the ripple can be increased. In addition, since a load applied onto input/output filters can be reduced, the filters can be downsized.

In such a conventional interleaved switching converter circuit, since the respective switching converters are turned ON/OFF with an appropriate phase difference, the switching frequency is fixed. Thus, it has been impossible to form an interleaved switching converter circuit by combining such switching converters as ringing choke converters having a switching frequency which is variable depending upon input/output conditions.

SUMMARY OF THE INVENTION

The interleaved switching converter circuit of the present invention includes: a first and a second switching converter which are connected in parallel to each other; a first control driver for turning ON/OFF the first switching converter; a charger/discharger having a first and a second capacitor and alternately charging/discharging the first and the second capacitors, in response to the turn ON/OFF of the first switching converter; and a second control driver for turning ON/OFF the second switching converter in synchronism with an inversion of a difference between voltages of the first and the second capacitors.

The interleaved switching converter circuit according to another aspect of the present invention includes: a first and a second switching converter which are connected in parallel to each other; a first control driver generating a first drive signal for driving a switch of the first switching converter; a charger/discharger having a first and a second capacitor, receiving the first drive signal, and alternately charging/discharging the first and the second capacitors in synchronism with the first drive signal; and a second control driver generating a second drive signal for driving a switch of the second switching converter. The second control driver receives voltages of the first and the second capacitors and generates the second drive signal in synchronism with an inversion of a difference between the voltages of the first and the second capacitors.

In one embodiment, the first switching converter is a switching converter operating in a critical mode in which current flows through a choke coil in a boundary mode between a continuous mode and a discontinuous mode.

In another embodiment, each of the first and the second capacitors is discharged to a zero voltage or to the vicinity thereof within a period after the inversion of the voltage difference between the first and the second capacitors has been detected and before charging of each said capacitor is started.

The interleaved switching converter circuit according to still another aspect of the present invention includes: a number N (where N is a natural number equal to or larger than 2) of switching converters which are connected in parallel to each other; a k-th (where k is also a natural number and $1 \leq k < N$) control driver generating a k-th drive signal for driving a switch of a k-th switching converter; a charger/discharger having a first and a second capacitor, receiving the k-th drive signal, and alternately charging/discharging the first and the second capacitors in synchronism with the k-th drive signal; and a (k+1)-th control driver generating a (k+1)-th drive signal for driving a switch of a (k+1)-th switching converter. The (k+1)-th control driver receives voltages of the first and the second capacitors and generates the (k+1)-th drive signal in synchronism with an inversion of a difference between the voltages of the first and the second capacitors.

In one embodiment, a level of current discharged by the charger/discharger is about (N/n−1) (where n is a natural number smaller than N and is prime with respect to N) times as high as a level of current charged by the charger/discharger at least until the difference between the voltages of the first and the second capacitors is inverted.

In another embodiment, a level of current discharged by the charger/discharger is about (N/n−1) (where n is a natural number equal to or smaller than N/2) times as high as a level of current charged by the charger/discharger at least until the difference between the voltages of the first and the second capacitors is inverted.

The interleaved switching converter circuit according to still another aspect of the present invention includes a number N (where N is an integer equal to or larger than 2) of switching converters which are connected in parallel to each other. An alternating current input voltage is rectified and input to each of the number N of switching converters. Each said switching converter applies a direct current output voltage to a load. A first switching converter includes: a first switch; a first current detector for detecting current flowing across the first switch, thereby outputting a first current signal; a voltage detector for detecting an output voltage of the interleaved switching converter circuit, thereby outputting a voltage signal; and a first control driver for outputting a first drive signal having a predetermined duty ratio, thereby driving the first switch. The first control driver determines and outputs a reference current signal from an input voltage obtained by rectifying the alternating current input voltage and from the voltage signal, and compares the first current signal with the reference current signal, thereby determining the duty ratio of the first drive signal. A k-th (where $1 < k \leq N$) switching converter includes: a k-th switch; a k-th current detector for detecting current flowing across the k-th switch, thereby outputting a k-th current signal; a voltage detector for detecting the output voltage of the interleaved switching converter circuit, thereby outputting the voltage signal; and a k-th control driver for outputting the k-th drive signal, thereby driving the k-th switch. The k-th control driver has a first and a second capacitor, detects a (k–1)-th drive signal of a (k–1)-th switching converter, alternately charges/discharges the first and the second capacitors in synchronism with a leading edge of the (k–1)-th drive signal, activates the k-th drive signal in synchronism with an inversion of a difference between the voltages of the first and the second capacitors, and compares the k-th current signal with the reference current signal, thereby determining a duty ratio of the k-th drive signal.

In the switching converter controlling method of the present invention, two capacitors are alternately charged/discharged in response to a turn ON/OFF of a first switching converter, and a second switching converter is turned ON/OFF by comparing voltages of the two capacitors with each other.

In the switching converter controlling method according to another aspect of the present invention, a period of a drive signal of a first switching converter is stored as a charge voltage for a capacitor, and a period of a drive signal of a second switching converter is determined based on the charge voltage of the capacitor.

Hereinafter, the functions or the effects to be attained by the present invention will be described.

In accordance with the present invention utilizing the above-described configurations, even when the switching frequency of a first switching converter is varied, a second switching converter can be driven with an arbitrary phase difference. On the leading edge of a first drive signal, a first capacitor is switched from a discharging state at 0 V into constant current charging state, and a second capacitor is simultaneously switched from a charging state into a discharging state. The initial voltage of the second capacitor at this charge/discharge transition point is proportional to a switching period. This is because the second capacitor has been charged with the constant current over one switching period of the first switching converter. The increasing voltage of the first capacitor being charged soon crosses the decreasing voltage of the second capacitor being discharged. This cross point, i.e., the leading edge of a second drive signal, is delayed from the leading edge of the first drive signal by a time interval proportional to the switching period. By appropriately setting the charge/discharge current to the respective capacitors, the second switching converter can be driven with an arbitrary phase difference with respect to the switching period of the first switching converter.

In a switching converter such as a ringing choke converter, when the reactor current of a transformer or a choke coil becomes zero, a switch is turned ON. Such an operation is called an operation in a critical mode which is in a boundary between a continuous mode (the reactor current flows continuously flows) and a discontinuous mode (the reactor current flows discontinuously). As compared with the continuous mode, the magnitude of the switching current and that of the input/output ripple current are larger, but the turn ON noise of the switch and diode recovery noise are small in the critical mode. Thus, the noise in a relatively low frequency region which is caused by a switching frequency or the harmonics thereof is large, but the noise in a relatively high frequency region which is caused by the turn ON noise and the recovery noise is small.

The present invention is applicable to a switching converter operating in a critical mode where the switching frequency is variable depending upon input/output conditions. By applying the present invention to such a switching converter operating in the critical mode, the input/output ripple current and noise in a low frequency region can be reduced.

Thus, the invention described herein makes possible the advantages of (1) providing an interleaved switching converter circuit in which the switching converters can be switched with an arbitrary phase difference and a variable switching frequency by performing a simplified control, and (2) providing a method for controlling the switching converters to be switched in such an interleaving manner.

These and other advantages of the present invention will become apparent to those skilled in the art upon reading and understanding the following detailed description with reference to the accompanying figures.

BRIEF DESCRIPTION OF THE DRAWINGS

FIG. 6 is a timing chart showing the waveforms of respective signals in a variant of the circuit sections shown in FIG. 3.

FIG. 7 is a timing chart showing the waveforms of respective signals in another variant of the circuit sections shown in FIG. 3.

FIG. 9 is a timing chart showing the waveforms of respective signals in the interleaved switching converter circuit shown in FIG. 8.

FIG. 10 is a timing chart showing the waveforms of the respective signals in the state where the switching period of the interleaved switching converter circuit shown in FIG. 8 has been varied.

FIG. 17 is a timing chart showing the waveforms of respective signals for illustrating the operation of a first boost converter in the interleaved switching converter circuit shown in FIG. 15.

FIG. 18 is a timing chart showing the waveforms of respective signals for illustrating the operation of a second boost converter in the interleaved switching converter circuit shown in FIG. 15.

FIG. 20 is a timing chart showing the waveforms of respective signals in the circuit sections shown in FIG. 19.

DESCRIPTION OF THE PREFERRED EMBODIMENTS

EXAMPLE 1

Figure 1:
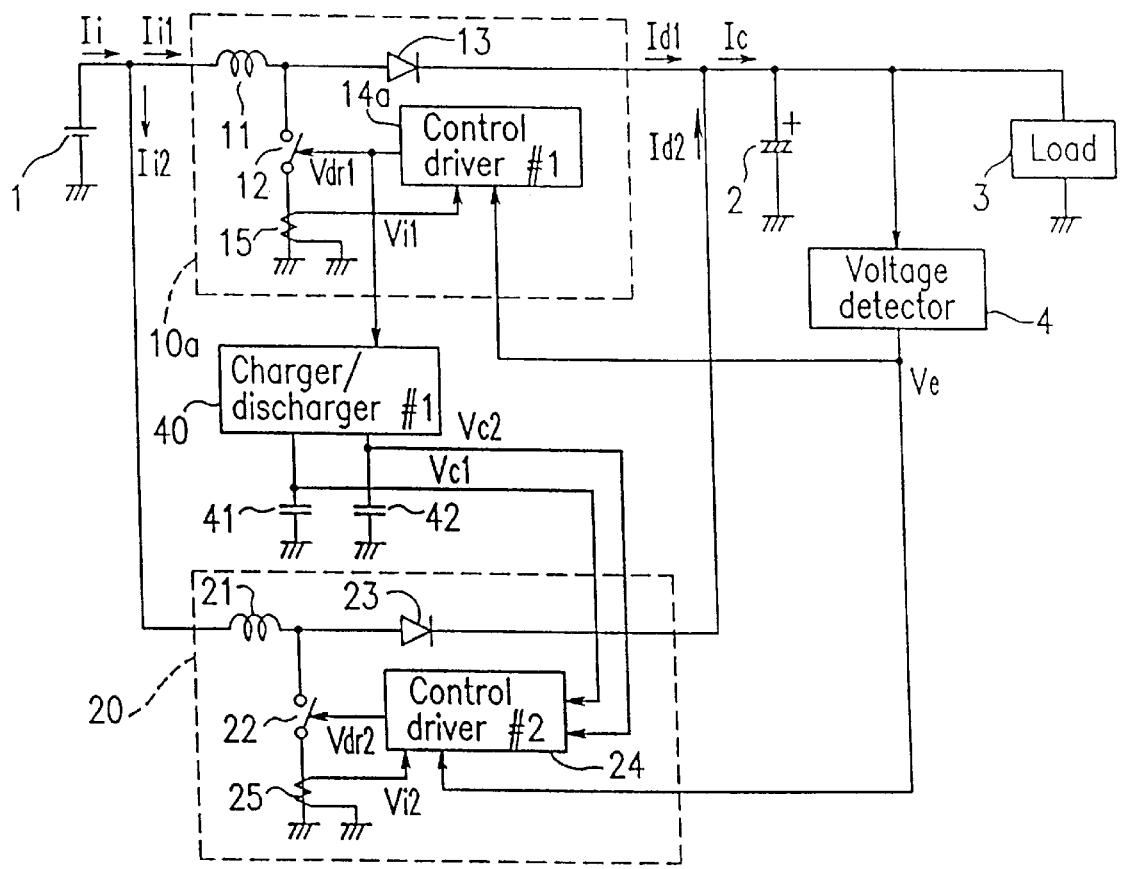
FIG. 1 is a block diagram showing an interleaved switching converter circuit in a first example of the present invention.
Figure 2:
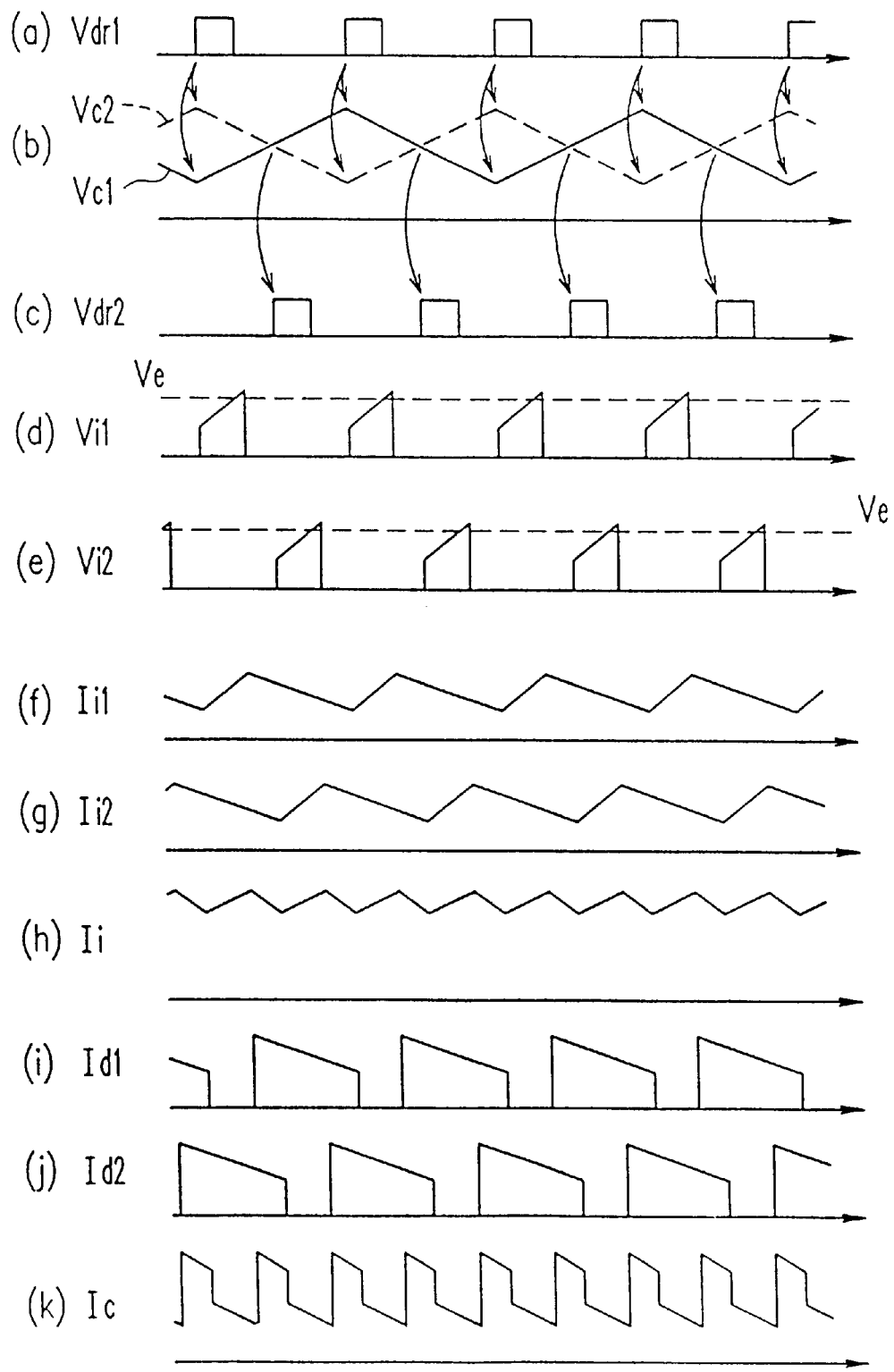
FIG. 2 is a timing chart showing the waveforms of respective signals in the interleaved switching converter circuit shown in FIG. 1.

FIG. 1 shows an interleaved switching converter circuit in a first example of the present invention. The interleaved switching converter circuit of the first example is configured by using two boost converters. FIG. 2 shows the waveforms of respective signals in the interleaved switching converter circuit shown in FIG. 1.

As shown in FIG. 1, the interleaved switching converter circuit includes: an input direct current (DC) power supply 1; an output capacitor 2; a load 3; and a first boost converter 10a. The first boost converter 10a includes: a first choke coil 11; a first switch 12; a first diode 13; a first control driver 14a; and a first current detector 15. The first current detector 15 detects the current flowing across the first switch 12, thereby outputting a first current signal Vi1.

The interleaved switching converter circuit further includes a second boost converter 20. The second boost converter 20 includes: a second choke coil 21; a second switch 22; a second diode 23; a second control driver 24; and a second current detector 25. The second current detector 25 detects the current flowing across the second switch 22, thereby outputting a second current signal Vi2.

The interleaved switching converter circuit further includes a voltage detector 4. The voltage detector 4 detects an output DC voltage to be applied from the output capacitor 2 onto the load 3, thereby outputting a voltage signal Ve representing a difference between the DC voltage and a reference voltage. The first control driver 14a receives the first current signal Vi1 and the voltage signal Ve, thereby outputting a first drive signal Vdr1 having a predetermined period and a predetermined duty ratio. The first switch 12 receives the first drive signal Vdr1 and is turned ON/OFF in response to the first drive signal Vdr1.

The interleaved switching converter circuit further includes: a charger/discharger 40; a first capacitor 41; and a second capacitor 42. The charger/discharger 40 receives the first drive signal Vdr1 and alternately charges/discharges the first and the second capacitors 41 and 42 with predetermined current in synchronism with the leading edge of the first drive signal Vdr1. Specifically, while the first capacitor 41 is being charged, the second capacitor 42 is discharged. Conversely, while the first capacitor 41 is being discharged, the second capacitor 42 is charged. The second control driver 24 receives a voltage Vc1 of the first capacitor 41, a voltage Vc2 of the second capacitor 42, the second current signal Vi2 and the voltage signal Ve, thereby outputting a second drive signal Vdr2 which is activated at the crossing of the waveforms of the voltages Vc1 and Vc2, and has a predetermined ON time period. The second switch 22 receives the second drive signal Vdr2, and is turned ON/OFF in response to the second drive signal Vdr2.

Hereinafter, the operation of the interleaved switching converter circuit having such a configuration will be described with reference to FIG. 2.

FIG. 2-(a) illustrates the waveform of the first drive signal Vdr1 output by the first control driver 14a. When the first drive signal Vdr1 is activated, the first switch 12 is turned ON and excitation current flows through the first choke coil 21. The first current detector 15 detects this excitation current, thereby outputting the first current signal Vi1 having a waveform shown in FIG. 2-(d). The level of the first current signal Vi1 is compared with that of the voltage signal Ve by the first control driver 14a. When the level of the first current signal Vi1 reaches the level of the voltage signal Ve, the first drive signal Vdr1 is deactivated. On the trailing edge of the first drive signal Vdr1, the first switch 12 is turned OFF. Then, the energy which has been stored in the first choke coil 11 is output as current Id1 having a waveform shown in FIG. 2-(i) via the first diode 13. Thus, the input current of the first boost converter 10a, i.e., the current Ii1 flowing through the first choke coil 11, becomes as shown in FIG. 2-(f).

FIG. 2-(b) illustrates the waveforms of the voltages Vc1 and Vc2 of the first and the second capacitors 41 and 42, respectively. The charger/discharger 40 receives the first drive signal Vdr1, and alternately charges and discharges the first and the second capacitors 41 and 42 in synchronism with the leading edge of the first drive signal Vdr1.

The second control driver 24 receives the first and the second voltages Vc1 and Vc2, and deactivates the second drive signal Vdr2 at the crossing of the first and the second voltages Vc1 and Vc2, as shown in FIG. 2-(c). When the second drive signal Vdr2 is received by the second switch 22, the second switch 22 is turned ON, so that excitation current flows through the second choke coil 21. The second current detector 25 detects this excitation current, thereby outputting the second current signal Vi2 having a waveform shown in FIG. 2-(e). The level of the second current signal Vi2 is compared with the level of the voltage signal Ve by the second control driver 24. When the level of the second current signal Vi2 reaches the level of the voltage signal Ve, the second drive signal Vdr2 is deactivated. On the trailing edge of the second drive signal Vdr2, the second switch 22 is turned OFF.

Then, the energy which has been stored in the second choke coil 21 is output as current Id2 having a waveform shown in FIG. 2-(j) via the second diode 23. Thus, the input current of the second boost converter 20, i.e., the current Ii2 flowing through the second choke coil 21, becomes as shown in FIG. 2-(g). When the output DC voltage increases, the level of the voltage signal Ve becomes lower. Conversely, when the output DC voltage decreases, the level of the voltage signal Ve becomes higher. The duty ratios of the switching periods of the switches 12 and 22 are controlled so as to stabilize the output DC voltage. Assuming the current to charge/discharge the first and the second capacitors 41 and 42 has a predetermined equal level, the waveforms of the voltages Vc1 and Vc2 cross each other at a time delayed from the leading edge of the first drive signal Vdr1 by a time interval corresponding to a half of one switching period.

That is to say, the first and the second boost converters 10a and 20 constitute an interleaved switching converter circuit having a phase difference equal to a half switching period. The input current Ii (=Ii1+Ii2) of this interleaved switching converter circuit varies as shown in FIG. 2-(h), while the charge current Ic (=Id1+Id2) to the output capacitor 2 varies as shown in FIG. 2-(k).

Figure 3:
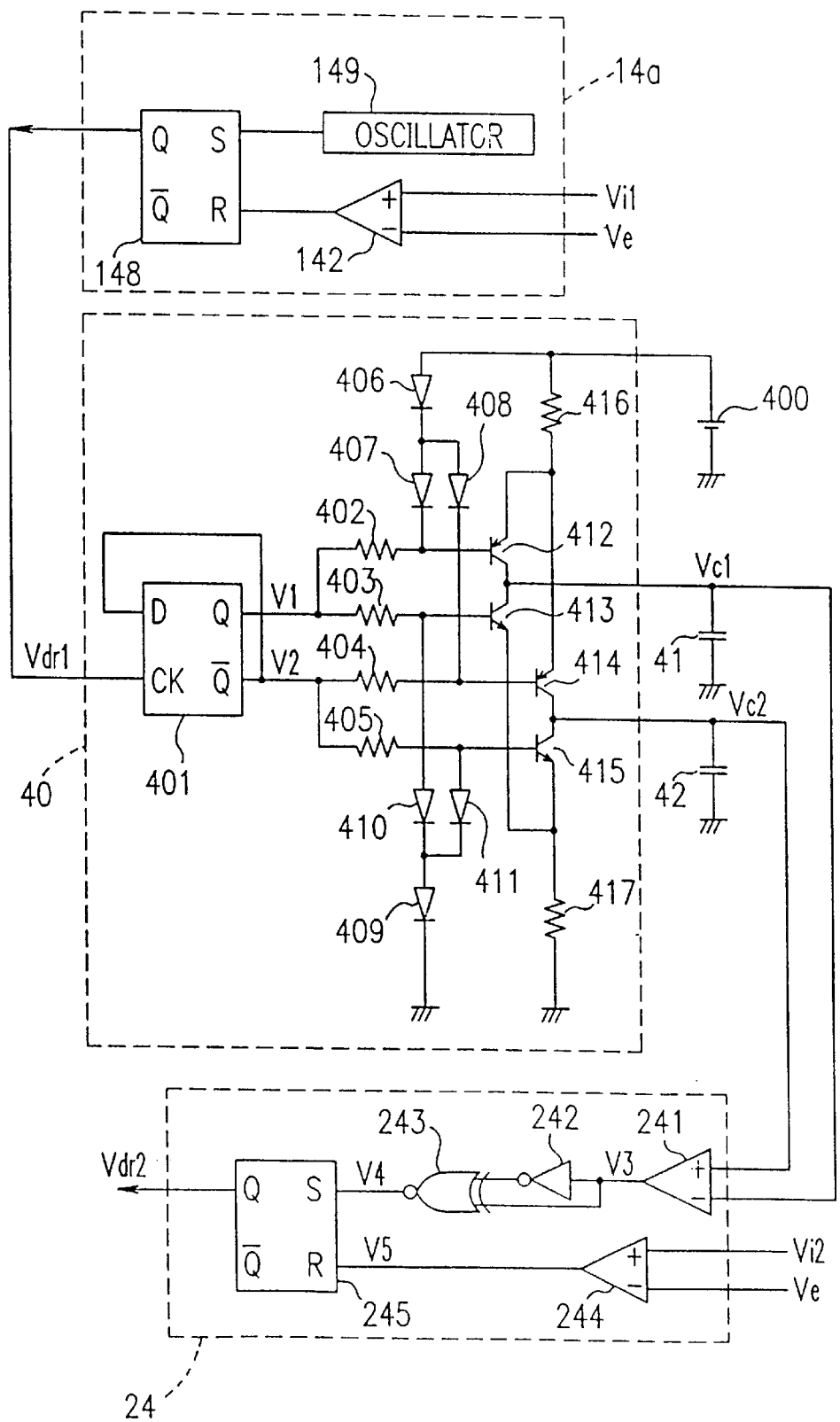
FIG. 3 is a block diagram showing specific circuit configurations of the control drivers and the charger/discharger of the interleaved switching converter circuit shown in FIG. 1.

FIG. 3 shows more specific circuit configurations of the first control driver 14a, the charger/discharger 40 and the second control driver 24.

Since the first control driver 14a is a conventional current mode controller, the operation thereof will be described only briefly. In the following description, the operations of the charger/discharger 40 and the second control driver 24 will be described in detail, with reference to the waveforms of the respective signals shown in FIG. 4.

In the first control driver 14a, a turn ON pulse having a predetermined frequency which has been generated by an oscillator 149 is received by an RS flip-flop 148 at a set terminal, thereby activating the first drive signal Vdr1. A first comparator 142 receives the first current signal Vi1 and the voltage signal Ve from the first current detector 15 and the voltage detector 4, respectively, and compares the levels thereof with each other. When the level of the first current signal Vi1 exceeds the level of the voltage signal Ve, the RS flip-flop receives a turn OFF pulse H at a reset terminal thereof, thereby deactivating the first drive signal Vdr1. By increasing/decreasing the level of the voltage signal Ve, the pulse width of the first drive signal Vdr1, i.e., the ON time period of the first switch 12, is regulated and the output DC voltage is stabilized.

The charger/discharger 40 includes: a controller biasing power supply 400 for performing a rectification and a ripple filtering on a voltage generated during the operation of the converter ordinarily by separately providing a coil such as a choke coil; a D flip-flop 401; resistors 402 to 405; diodes 405 to 411; transistors 412 to 415; and resistors 416 and 417 for controlling the charge/discharge current. On the other hand, the second control driver 24 includes: a first comparator 241; an inverter 242; an exclusive-NOR element 243, the output of which is to be determined; a second comparator 244; and an RS flip-flop 245.

Figure 4:
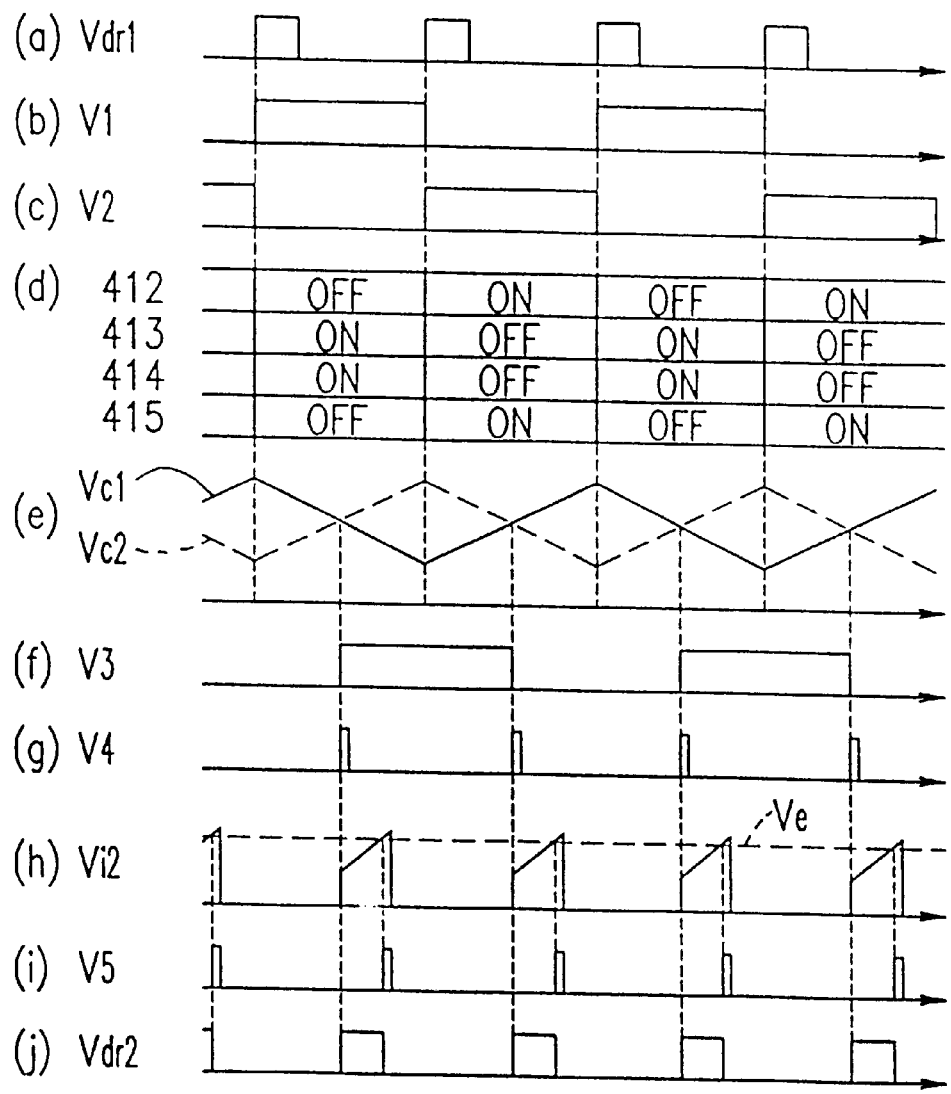
FIG. 4 is a timing chart showing the waveforms of respective signals in the circuit sections shown in FIG. 3.

FIG. 4 shows the waveforms of the respective signals in the charger/discharger 40 and the second control driver 24. Hereinafter, the operations of these circuits 40 and 24 will be described with reference to FIG. 4.

FIG. 4-(a) illustrates the waveform of the first drive signal Vdr1. The D flip-flop 401 receives the first drive signal Vdr1 at a CK terminal thereof, thereby outputting signals V1 and V2. The levels of the signals V1 and V2 are inverted in synchronism with the leading edge of the first drive signal Vdr1 as shown in FIGS. 4-(b) and (c). FIG. 4-(d) shows the ON/OFF states of the respective transistors 412 to 415. When the signal V1 is at the H (high) level and the signal V2 is at the L (low) level, a PNP transistor 412 and an NPN transistor 415 are OFF and an NPN transistor 413 and a PNP transistor 414 are ON. Consequently, the first capacitor 41 is discharged and the second capacitor 42 is charged Conversely, when the signal V1 is at the L level and the signal V2 is at the H level, the PNP transistor 412 and the NPN transistor 415 are ON and the NPN transistor 413 and the PNP transistor 414 are OFF. Consequently, the first capacitor 41 is charged and the second capacitor 42 is discharged.

FIG. 4-(e) shows these charging/discharging states. Assuming the resistance values of the resistors 416 and 417 to be equally denoted by R and the forward voltage drop of each of the diodes 406 to 411 and the base voltage and the emitter voltage of each of the transistors 412 to 415 to be equally denoted by Vd, the charge/discharge current becomes constant current represented by Vd/R. The first comparator 241 receives the voltages Vc1 and Vc2 of the first and the second capacitors 41 and 42, respectively, thereby outputting a signal V3, the level of which is inverted at the crossing of these two voltages Vc1 and Vc2, as shown in FIG. 4-(f).

The signal V3 is input to the inverter 242 and the exclusive-NOR element 243, which outputs a one-shot pulse V4 in synchronism with the inversion of the signal V3 as shown in FIG. 4-(g). The RS flip-flop 245 receives the one-shot pulse V4 at the set terminal thereof, thereby activating the output thereof, i.e., the second drive signal Vdr2, in synchronism with the one-shot pulse V4. The second comparator 244 receives the second current signal Vi2 and the voltage signal Ve, compares the levels of these two signals, and then outputs a signal V5 to the reset terminal of the RS flip-flop 245 as shown in FIGS. 4-(h) and (i). The second drive signal Vdr2 is deactivated in synchronism with the leading edge of the signal V5 as shown in FIG. 4-(j).

Figure 5:
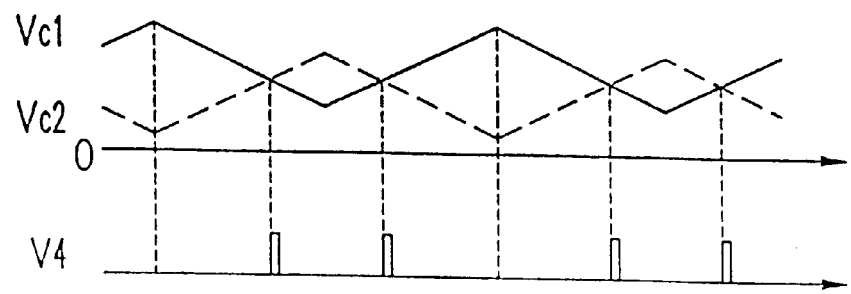
FIG. 5 is a timing chart showing the waveforms of respective signals in the circuit sections shown in FIG. 3 in the state where the potentials of the first and the second capacitors have deviated.

When the voltages Vc1 and Vc2 of the first and the second capacitors 41 and 42 are always over the zero potential as in the cases of FIG. 2-(b) and FIG. 4-(e), if the switching period is varied by the abrupt change in input/output conditions and the like, then the waveforms of the voltages Vc1 and Vc2 become irregularly stabled to have a deviation, as shown in FIG. 5. As a result, the crossing between the voltages Vc1 and Vc2 adversely varies and the phase difference between the first and the second drive signals Vdr1 and Vdr2 become inconstant. In order to solve such a problem, the discharge current of the first and the second capacitors 41 and 42 may be set at a higher level than that of the charge current thereof. Then, even though the voltages Vc1 and Vc2 sometimes deviate in a transitional manner, the voltages of these capacitors are settled to the vicinity of zero voltage and the phase difference between the first and the second drive signals Vdr1 and Vdr2 becomes constant when discharging is completed. In addition, since the waveforms of the voltages Vc1 and Vc2 cross each other at an earlier time after the first drive signal Vdr1 has been activated, the delay between the leading edge of the first drive signal Vdr1 and the leading edge of the second drive signal Vdr2 can also be corrected.

Furthermore, if the discharge current of the first and the second capacitors 41 and 42 is intentionally set at a higher level than that of the charge current thereof, the second drive signal Vdr2 can be activated with an arbitrary delay time (i.e., with an arbitrary phase difference) within a half switching period, as shown in FIG. 6.

Assuming that a capacitance value of the first and the second capacitors 41 and 42 is denoted by C, a switching period is denoted by Ts, and the charge current is denoted by Ich, the voltage Vc1 of the first capacitor 41 during charging is represented by Vc1=Ich·t/C, and the voltage Vch of the first capacitor 41 when the charging is completed is represented by Vc1=Ich·Ts/C. On the other hand, assuming the discharge current to be represented by A·Ich (A>1), the voltage Vc2 of the second capacitor 42 during discharging is represented by Vc2=Ich·Ts/C−A·Ich·t/C=(Ts−A·t)·Ich/C. The crossing time becomes t=Ts/(1+A) because Vc1=Vc2. In other words, the delay time Td can be set so as to have a duration 1/(1+A) of that of one switching period.

The foregoing description is about a case where the discharge current is set at a level higher than that of the charge current. Substantially the same description is applicable to the case where the charge current is conversely set at a level higher than that of the discharge current. In the case of setting the discharge current at a higher level, the charging of the voltages Vc1 and Vc2 of the first and the second capacitors 41 and 42 is always started from the vicinity of the zero voltage. On the other hand, in the case of setting the charge current at a higher level, the discharging is started from the vicinity of a predetermined upper limit voltage, as shown in FIG. 7. As is clear from FIG. 7, the delay time Td may be set in accordance with the level of the charge current.

EXAMPLE 2

Figure 8:
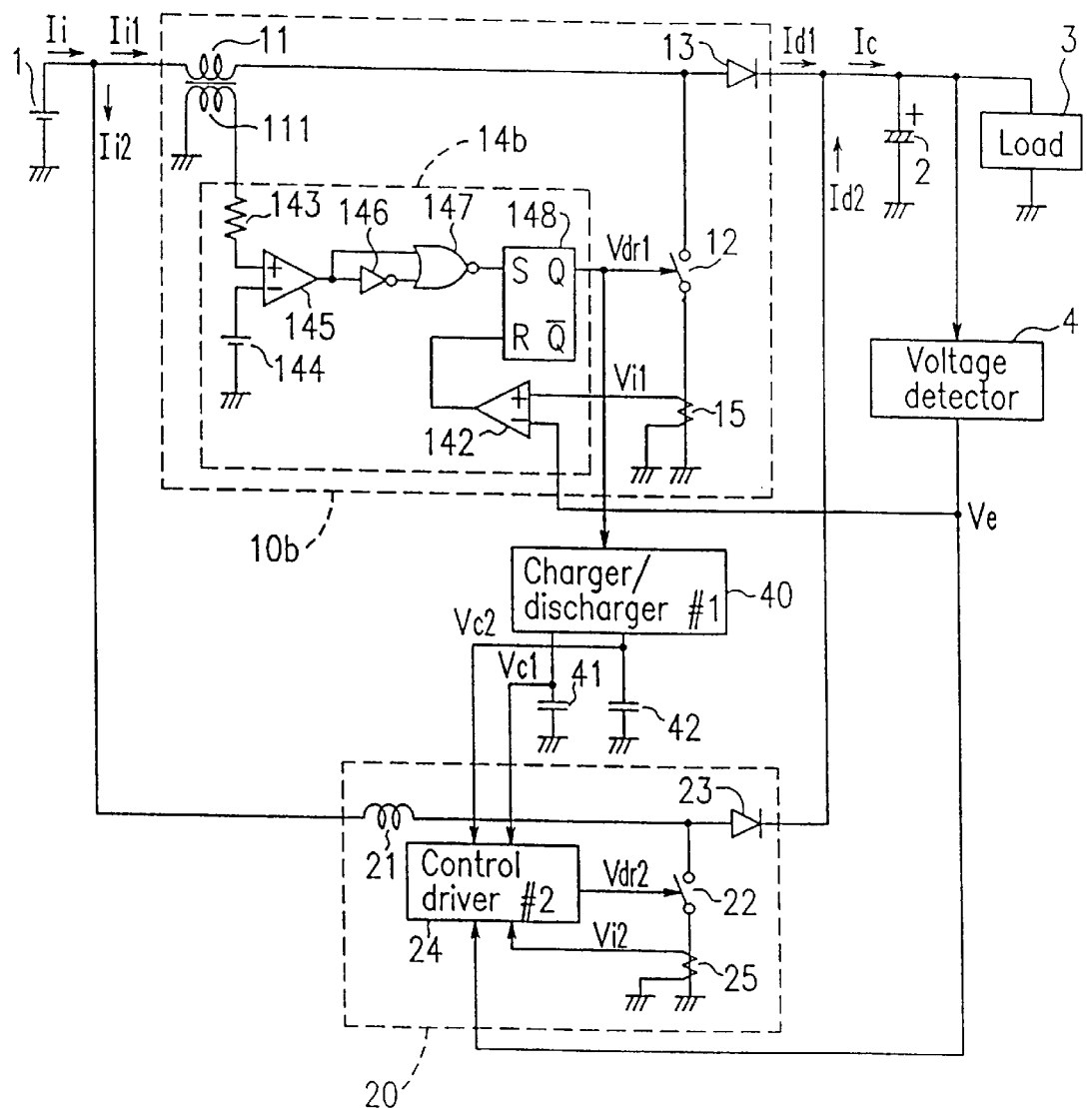
FIG. 8 is a block diagram showing an interleaved switching converter circuit in a second example of the present invention.
Figure 10:
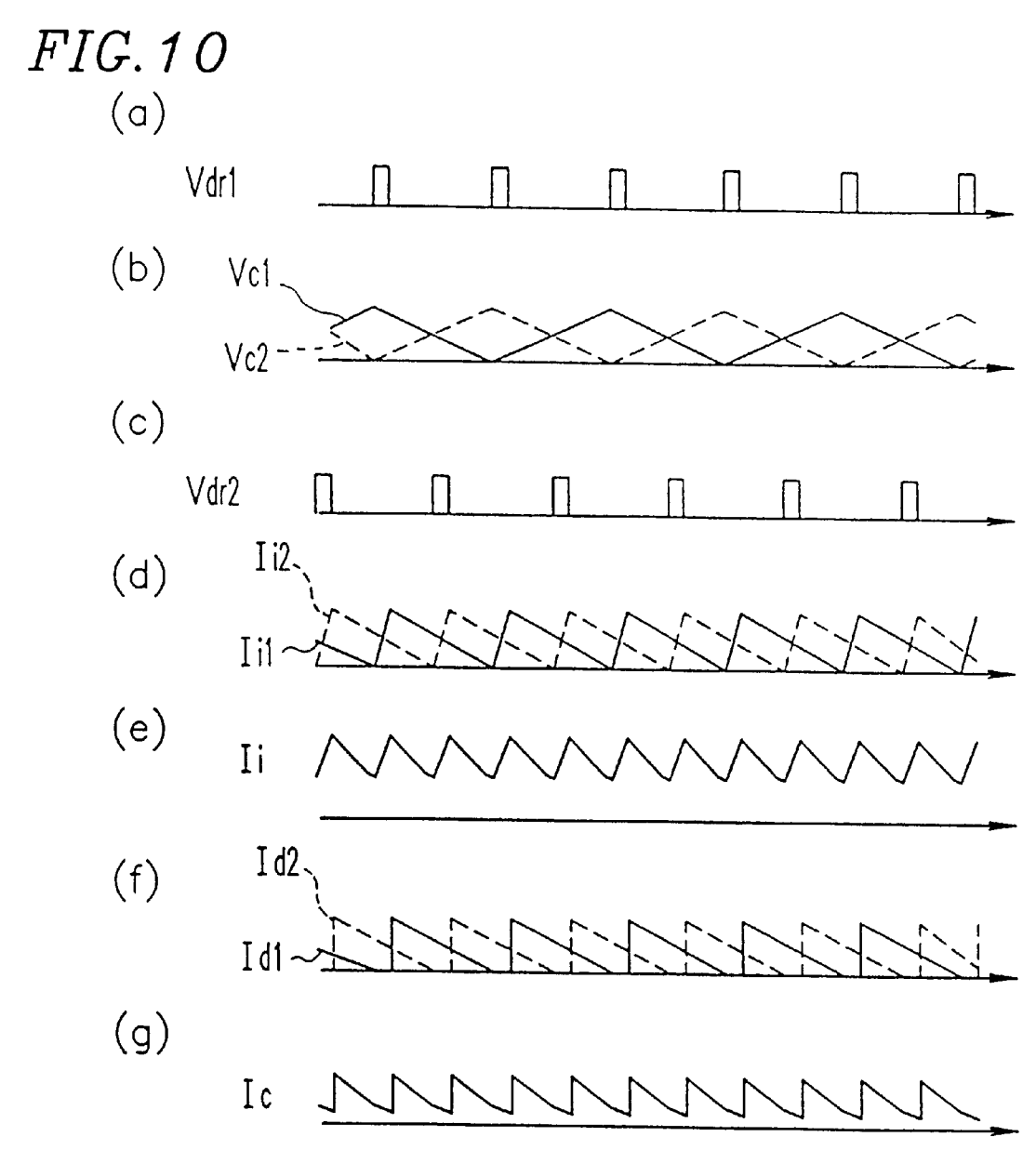

FIG. 8 shows a circuit configuration of an interleaved switching converter circuit in a second example of the present invention. FIGS. 9 and 10 show the waveforms of respective signals. The interleaved switching converter circuit shown in FIG. 8 is different from the interleaved switching converter circuit shown in FIG. 1 in that a reset detecting winding 111 is additionally provided for the first choke coil 11 of the first boost converter 10b and in that a first control driver 14b receives a voltage generated in the reset detecting winding 111.

The control driver 14b does not include the oscillator 149 of the first control driver 14a in the first example, but includes: a resistor 143; a reference voltage source 144; a second comparator 145; an inverter 146; and an NOR element 147. When the second comparator 145 detects the inversion of a voltage in the first choke coil 11 and changes the output thereof from H to L, the NOR element 147 outputs a turn ON pulse, thereby activating the first drive signal Vdr1. The operation of deactivating the first drive signal Vdr1 is performed in the same way as in the first control driver 14a of the first example.

According to the present invention, even when a switching frequency is varied, the second boost converter 20 can always operate with a delay time corresponding to a predetermined ratio of one switching period. This feature of the present invention will be described with reference to FIGS. 9 and 10.

FIG. 9-(a) illustrates the waveform of the first drive signal Vdr1. When the first drive signal Vdr1 is activated, the first switch 12 is turned ON and input current Ii1, the level of which linearly increases from zero as shown in FIG. 9-(d), flows through the first choke coil 11. The first current detector 15 detects this input current Ii1. The level of the first current signal Vi1 corresponding to the input current Ii1 is compared with the level of the voltage signal Ve by the first control driver 14b. When the level of the first current signal Vi1 reaches the level of the voltage signal Ve, the first drive signal Vdr1 is deactivated by the first control driver 14b, so that the first switch 12 is turned OFF. Then, the energy which has been stored in the first choke coil 11 is released as current Id1 flowing through the first diode 13 as shown in FIG. 9-(f).

When the current Id1 has finished flowing, the voltage of the first choke coil 11 is inverted. The voltage inversion of the first choke coil 11 is detected by the first control driver 14b via the reset detecting winding 111. As described above, when the first control driver 14b detects the voltage inversion of the first choke coil 11, the first control driver 14b activates the first drive signal Vdr1 and turns the first switch 12 ON. Thereafter, the first boost converter 10b repeatedly performs the same operation.

Thus, the first boost converter 10b is a kind of ringing choke converter and is a switching converter operating in a critical mode. In the critical mode, the generation of diode recovery noise can be advantageously prevented, but the input/output ripple current is disadvantageously large. In addition, the higher an input voltage becomes or the smaller the output current becomes, the higher the switching frequency becomes in such a mode.

Next, the operation of the second boost converter 20 will be described. FIG. 9-(b) illustrates the waveforms of the voltages Vc1 and Vc2 of the first and the second capacitors 41 and 42, respectively. The charger/discharger 40 receives the first drive signal Vdr1, and alternately charges and discharges the voltages Vc1 and Vc2 of the first and the second capacitors 41 and 42 in synchronism with the leading edge of the first drive signal Vdr1. The second control driver 24 receives the voltages Vc1 and Vc2, and activates the second drive signal Vdr2 at the crossing of the voltages Vc1 and Vc2, as shown in FIG. 9-(c). When the second drive signal Vdr2 is received by the second switch 22, the second switch 22 is turned ON, so that input current Ii2, the level of which linearly increases from zero as shown in FIG. 9-(d), flows through the second choke coil 21. The second current detector 25 detects this input current Ii2. The level of the second current signal Vi2 corresponding to the input current Ii2 is compared with the level of the voltage signal Ve by the second control driver 24. When the level of the second current signal Vi2 reaches the level of the voltage signal Ve, the second drive signal Vdr2 is deactivated by the second control driver 24. On the trailing edge of the second drive signal Vdr2, the second switch 22 is turned OFF. Then, the energy which has been stored in the second choke coil 21 is released as current Id2 flowing through the second diode 23 as shown in FIG. 9-(f).

If the inductance value of the second choke coil 21 is set to be equal to or lower than that of the first choke coil 11, then the energy stored in the second choke coil 21 becomes equal to or smaller than that stored in the first choke coil 11. Consequently, when the second drive signal Vdr2 is activated, the current Id2 is zero. Thus, the input current Ii2 of the second boost converter 20 becomes as shown in FIG. 9-(d).

Assuming the discharge current of the first and the second capacitors 41 and 42 is constant current slightly larger than the charge current of these capacitors, the waveforms of the voltages Vc1 and Vc2 cross each other at a time delayed from the leading edge of the first drive signal Vdr1 by about a half switching period. That is to say, the first and the second boost converters 10b and 20 constitute an interleaved switching converter circuit having a phase difference equal to a half switching period. The input current Ii (=Ii1+Ii2) of this interleaved switching converter circuit varies as shown in FIG. 9-(e), while the charge current Ic (=Id1+Id2) to the output capacitor 2 varies as shown in FIG. 9-(g).

Since the first switching converter 10b operates in a critical mode as described above, the interleaved switching converter circuit of the second example also operates in the critical mode. In such a critical mode, the higher an input voltage becomes or the smaller output current becomes, the higher the switching frequency becomes. FIG. 10 shows the waveforms of the respective signals in the case where the magnitude of the output current has become smaller. In this case, though the switching period becomes shorter, the voltages Vc1 and Vc2 of the first and the second capacitors 41 and 42 has a smaller amplitude as shown in FIG. 10-(b). As a result, the phase difference between the voltages Vc1 and Vc2 at the crossing thereof remains equal to a half switching period with respect to the leading edge of the first drive signal Vdr1.

As can be understood from the foregoing description, in the interleaved switching converter circuit of the present invention, even when a switching frequency is varied, the second drive signal Vdr2 can be activated so as to be delayed from the leading edge of the first drive signal Vdr1 by a time interval corresponding to a predetermined ratio of one switching period.

EXAMPLE 3

Figure 11:
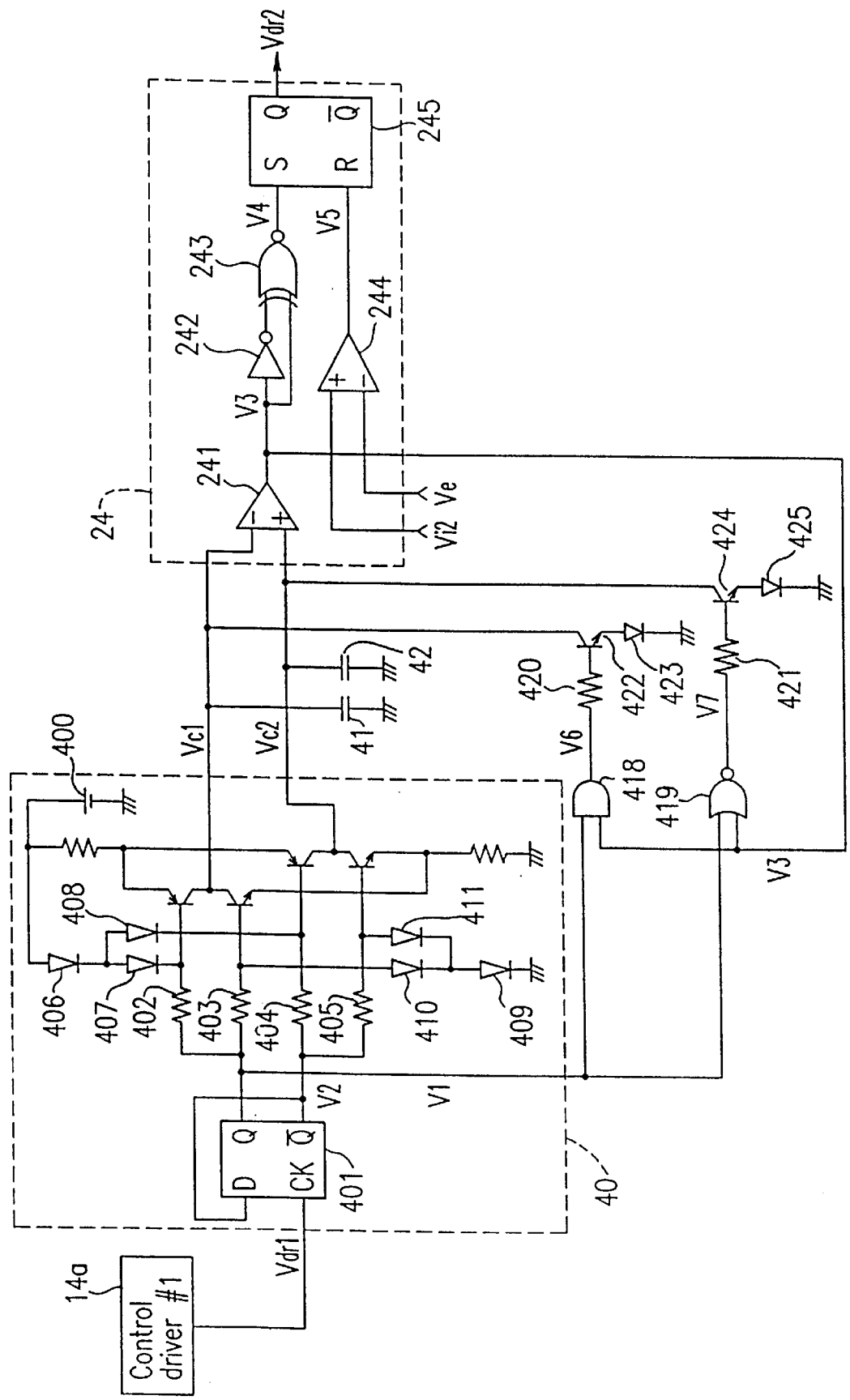
FIG. 11 is a block diagram showing the configurations of a charger/discharger and a second control driver which are principal circuit sections of an interleaved switching converter circuit in a third example of the present invention.
Figure 12:
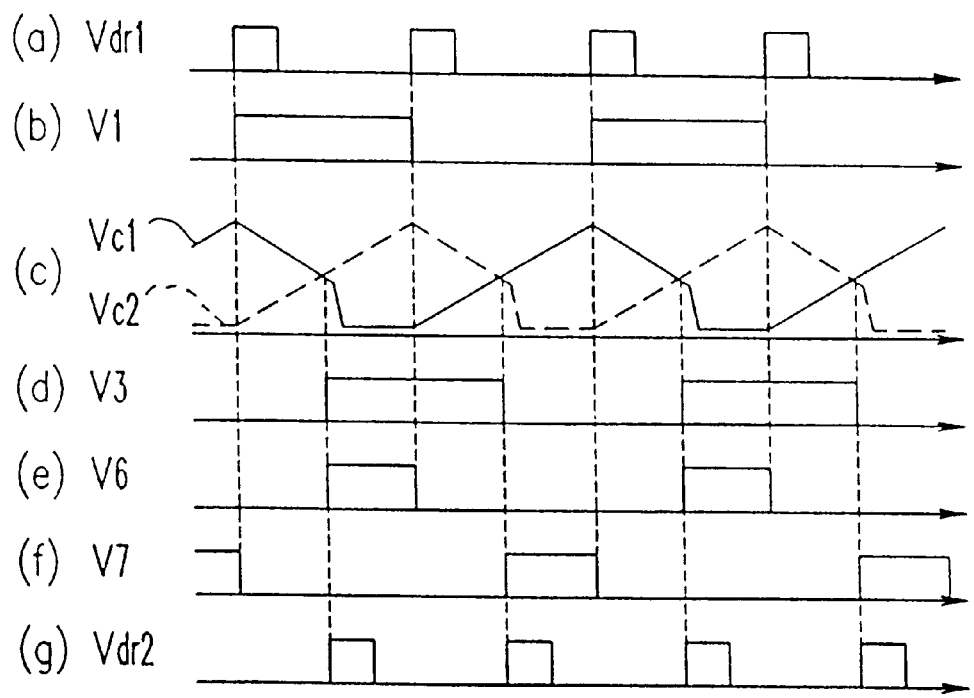
FIG. 12 is a timing chart showing the waveforms of respective signals in the circuit sections shown in FIG. 12.

FIG. 11 shows circuit configurations of a charger/discharger and a second control driver which constitute principal sections of an interleaved switching converter circuit in a third example of the present invention FIG. 12 shows the waveforms of the respective signals thereof. In the interleaved switching converter circuit shown in FIG. 11, an AND element 418 and a NOR element 419, to both of which signals V1 and V3 are input from the D flip-flop 401 and the comparator 241; resistors 420 and 421; a transistor 422 and a diode 423 for quickly discharging the first capacitor 41; and a transistor 424 and a diode 425 for quickly discharging the second capacitor 42 are additionally provided between the charger/discharger 40 and the second control driver 24 of the interleaved switching converter circuit shown in FIG. 3.

FIG. 12-(a) illustrates the waveform of the first drive signal Vdr1. The D flip-flop 401 receives the first drive signal Vdr1 at the CK terminal thereof, thereby outputting the signal V1, the level of which is inverted in synchronism with the leading edge of the first drive signal Vdr1 as shown in FIG. 12-(b). In the same way as in the interleaved switching converter circuit shown in FIG. 3, the first and the second capacitors 41 and 42 are charged and discharged in response to the signal V1. FIG. 12-(d) illustrates the waveform of an output signal V3 of the first comparator 241 receiving the voltages Vc1 and Vc2 of the first and the second capacitors 41 and 42 having the waveforms shown in FIG. 12-(c). Also, in the same way as in the interleaved switching converter circuit shown in FIG. 3, the second drive signal Vdr2 is obtained as shown in FIG. 12-(g) in response to the signal V3.

FIG. 12-(e) illustrates the waveform of an output signal V6 of the AND element 418 to which the signals V1 and V3 have been input, and FIG. 12-(f) illustrates the waveform of an output signal V7 of the NOR element 419 to which the signals V1 and V3 have also been input. The transistor 422 to be driven in response to the signal V6 quickly discharges the first capacitor 41 to the vicinity of the zero potential during a period after the voltage Vc1 of the first capacitor 41 being discharged became lower than the voltage Vc2 of the second capacitor 42 and before the charging of the first capacitor 41 is started.

On the other hand, the transistor 424 to be driven in response to the signal V7 quickly discharges the second capacitor 42 to the vicinity of the zero potential during a period after the voltage Vc2 of the second capacitor 42 being discharged became lower than the voltage Vc1 of the first capacitor 41 and before the charging of the second capacitor 42 is started.

As described above, in the steady state, the interleaved switching converter circuit shown in FIG. 11 is not different from the circuit shown in FIG. 3. However, in the circuit of this example, the first and the second capacitors 41 and 42 are always charged from the vicinity of the zero potential. Thus, even when a switching period is varied by the variation of input/output conditions, the deviation of the voltages Vc1 and Vc2 of the first and the second capacitors 41 and 42 can be quickly corrected, and the delay time until the leading edge of the second drive signal Vdr2 can be rapidly stabilized.

EXAMPLE 4

Figure 13:
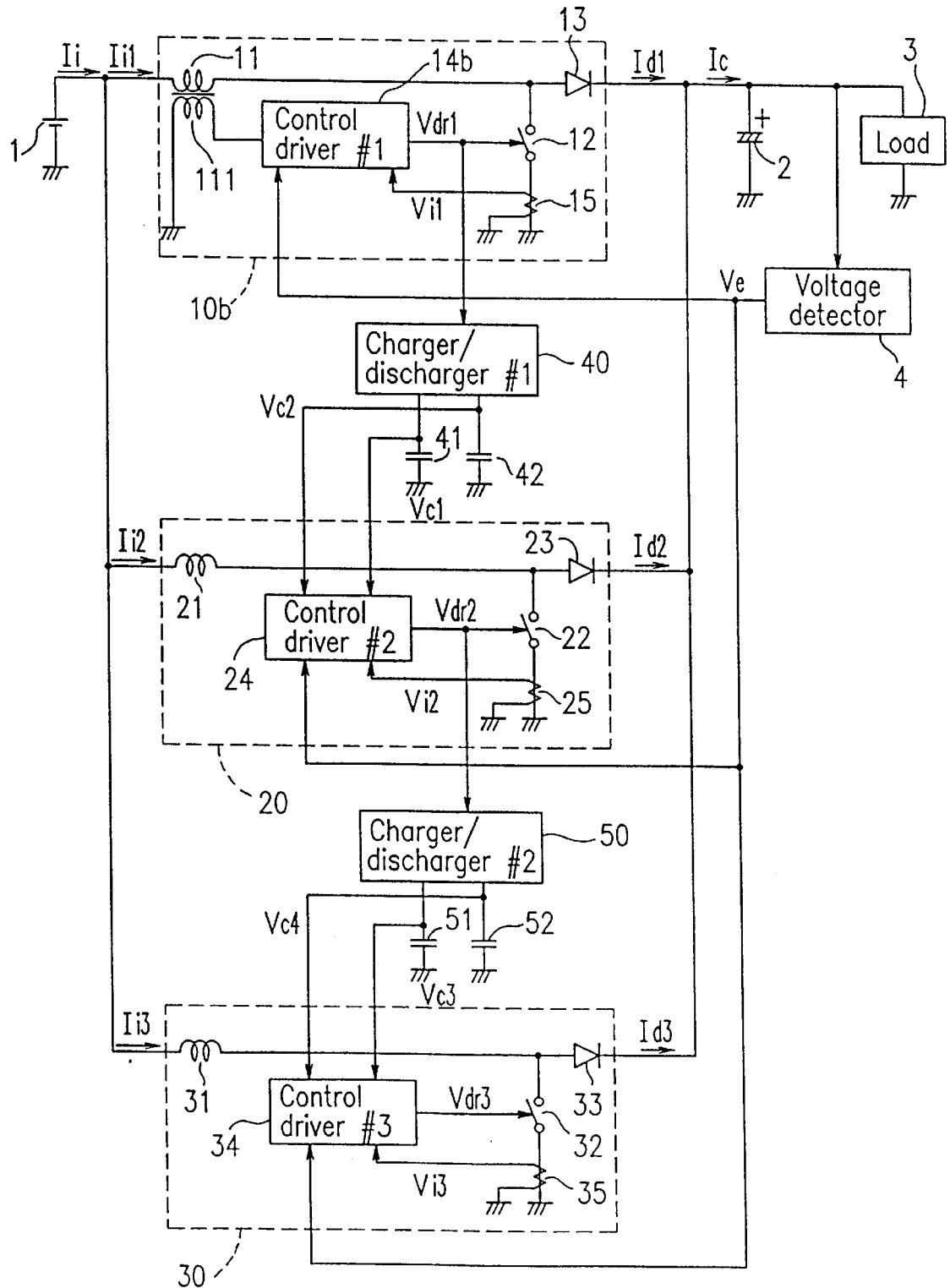
FIG. 13 is a block diagram showing an interleaved switching converter circuit in a fourth example of the present invention.

FIG. 13 shows the circuit configuration of an interleaved switching converter circuit in a fourth example of the present invention. The interleaved switching converter circuit of the fourth example includes three boost converters. By extensively applying the circuit configuration of the fourth example, a number N (where N is an integer equal to or larger than 3) of boost converters can be operated in parallel.

In this example, the first and the second boost converters have the same configurations as those of the boost converters 10b and 20 shown in FIG. 8, respectively. The interleaved switching converter circuit of the fourth example further includes: a third boost converter 30; a second charger/discharger 50; and a third and a fourth capacitor 51 and 52. The third boost converter 30 includes: a third choke coil 31; a third switch 32; a third diode 33; a third control driver 34; and a third current detector 35.

The first control driver 14b compares the levels of the first current signal Vi1 and the voltage signal Ve, thereby outputting a first drive signal Vdr1 having a predetermined duty ratio in order to stabilize the output voltage of the boost converter 10b. The first switch 12 receives the first drive signal Vdr1, and is turned ON/OFF in response to the first drive signal Vdr1 The first charger/discharger 40 charges/discharges the first and the second capacitors 41 and 42 in synchronism with the leading edge of the first drive signal Vdr1 supplied from the first control driver 14b. The second control driver 24 receives the voltages Vc1 and Vc2 of the first and the second capacitors 41 and 42, thereby outputting a second drive signal Vdr2 which is activated at the crossing between the voltages Vc1 and Vc2 and has an ON time period to be determined by the comparison between the second current signal Vi2 and the voltage signal Ve. The second switch 22 receives the second drive signal Vdr2 and is turned ON/OFF in response to the second drive signal Vdr2.

The second charger/discharger 50 receives the second drive signal Vdr2 and charges/discharges the third and the fourth capacitors 51 and 52 in synchronism with the leading edge of the second drive signal Vdr2. The third control driver 34 receives the voltages Vc3 and Vc4 of the third and the fourth capacitors 51 and 52, thereby outputting a third drive signal Vdr3 which is activated at the crossing between the voltages Vc3 and Vc4.

In this case, the electrostatic capacitance values of the first, second, third and fourth capacitors 41, 42, 51 and 52 are assumed to be equal to each other, the charge current of the chargers/dischargers 40 and 50 is equal to each other, the discharge current of the chargers/dischargers 40 and 50 is also equal to each other, and the discharge current is set so as to have a magnitude twice as large as that of the charge current. Consequently, the voltages Vc1 and Vc2 of the first and the second capacitors 41 and 42 cross each other at a time delayed from the leading edge of the first drive signal Vdr1 by one-third of one switching period. Similarly, the voltages Vc3 and Vc4 of the third and the fourth capacitors 51 and 52 cross each other at a time delayed from the leading edge of the second drive signal Vdr2 by one-third of one switching period.

Next, the operation of the interleaved switching converter circuit of the fourth example will be described in more detail with reference to the waveforms of the respective signals shown in FIG. 14.

Figure 14:
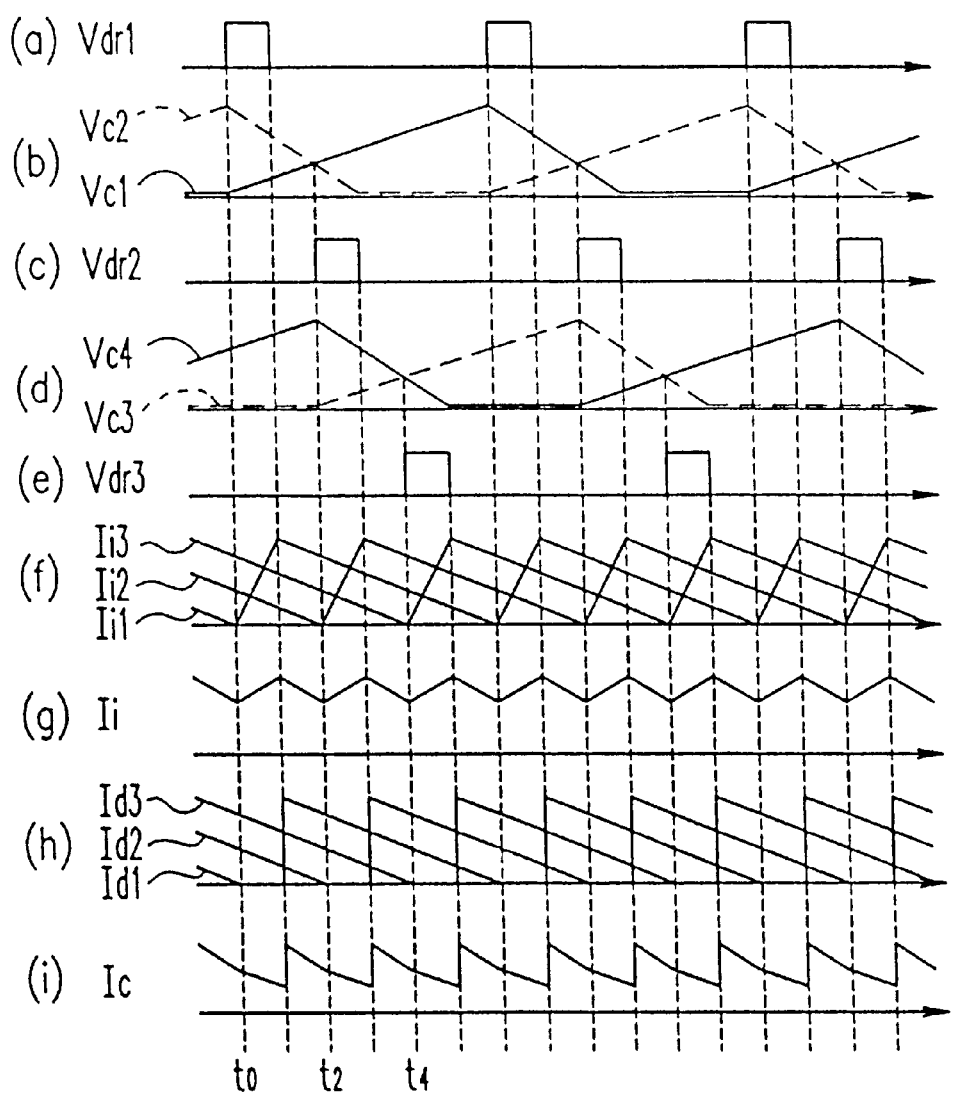
FIG. 14 is a timing chart showing the waveforms of respective signals in the interleaved switching converter circuit shown in FIG. 13.

FIG. 14-(a) illustrates the waveform of the first drive signal Vdr1. FIG. 14-(b) illustrates the waveforms of the voltages Vc1 and Vc2 of the first and the second capacitors 41 and 42. Since the magnitude of the discharge current is set to be twice as large as that of the charge current, the voltages Vc1 and Vc2 cross each other at a time t2 later than a time t0 of the leading edge of the first drive signal Vdr1 by a time interval corresponding to one-third of one switching period. At the time t2, the second drive signal Vdr2 is activated as shown in FIG. 14-(c). FIG. 14-(d) illustrates the waveforms of the voltages Vc3 and Vc4 of the third and the fourth capacitors 51 and 52. Since the magnitude of the discharge current is set to be twice as large as that of the charge current, the voltages Vc3 and Vc4 cross each other at a time t4 later than the time t2 of the leading edge of the second drive signal Vdr2 by a time interval corresponding to one-third of one switching period. At the time t4, the third drive signal Vdr3 is activated as shown in FIG. 14-(e).

As a result, the waveforms of the input current Ii1, Ii2 and Ii3 of the boost converters 10b, 20 and 30 become as shown in FIG. 14-(f). The input current Ii or the sum of Ii1, Ii2 and Ii3 has a waveform with a reduced ripple as shown in FIG. 14-(g). On the other hand, the waveforms of the current Id1, Id2 and Id3 flowing through the diodes of the respective boost converters 10b, 20 and 30 become as shown in FIG. 14-(h). The charge current Ic or the sum of Id1, Id2 and Td3 to be supplied to the output capacitor 2 has a waveform with a reduced ripple as shown in FIG. 14-(i).

Also, in the same way as in the second example shown in FIG. 8, the first boost converter 10b is a ringing choke converter and a switching frequency is variable depending upon input/output conditions. In the fourth example, even when the switching frequency is varied, the phase difference among the respective switching converters can be held at a value equal to one-third of one switching period by varying the amplitudes of the voltages Vc1 through Vc4 of the first to the fourth capacitors 41, 42, 51 and 52.

As can be understood from the description of the fourth example, if the magnitude of discharge current is set to be A times as large as that of charge current, the phase difference can be set to be 1/(1+A) of one switching period.

Herein, the number of boost converters is assumed to be denoted by N. In FIG. 13, since N=3, A is set at 2 and the phase difference is set to be one-third of one switching period. As will be understood easily, if N=4, then A may be set at 3, and the phase difference may be set to be one-fourth of one switching period. Moreover, if N=5, then A may be set at 4, and the phase difference may be set to be one-fifth of one switching period. Furthermore, A may be set at 1.5 and the phase difference may be set to be two-fifths of one switching period. Furthermore, if a quick charger such as that provided in the third example shown in FIG. 11 is additionally provided, A may be set at a value smaller than 1. Thus, when N=3, A may also be set at 0.5 and the phase difference may also be set to be two-thirds of one switching period.

The above-described relationship can be generalized as follows. In an interleaved switching converter circuit including a number N of boost converters, if A is set to be equal to N/n−1, then the respective boost converters can be switched with a phase difference which corresponds to n/N of one switching period. Herein, n is a natural number smaller than N and prime with respect to N or a natural number equal to or smaller than N/2. When n is a natural number smaller than N and prime with respect to N, (N/n−1)=2/5, 7/5, 2, 3, 5/3, 3/2, 5/2, . . . , etc. On the other hand, when n is a natural number equal to or smaller than N/2, (N/n−1)=3, 7/2, 4, . . . , etc.

In the foregoing first to fourth examples, each charger/discharger is provided separately from respective boost converters. Alternatively, if the charger(s)/discharger(s) is/are integrated with the second (third, and so on) control driver(s) except for the first control driver, then an interleaved switching converter circuit having more universal applications can be formed at lower costs.

EXAMPLE 5

Figure 15:
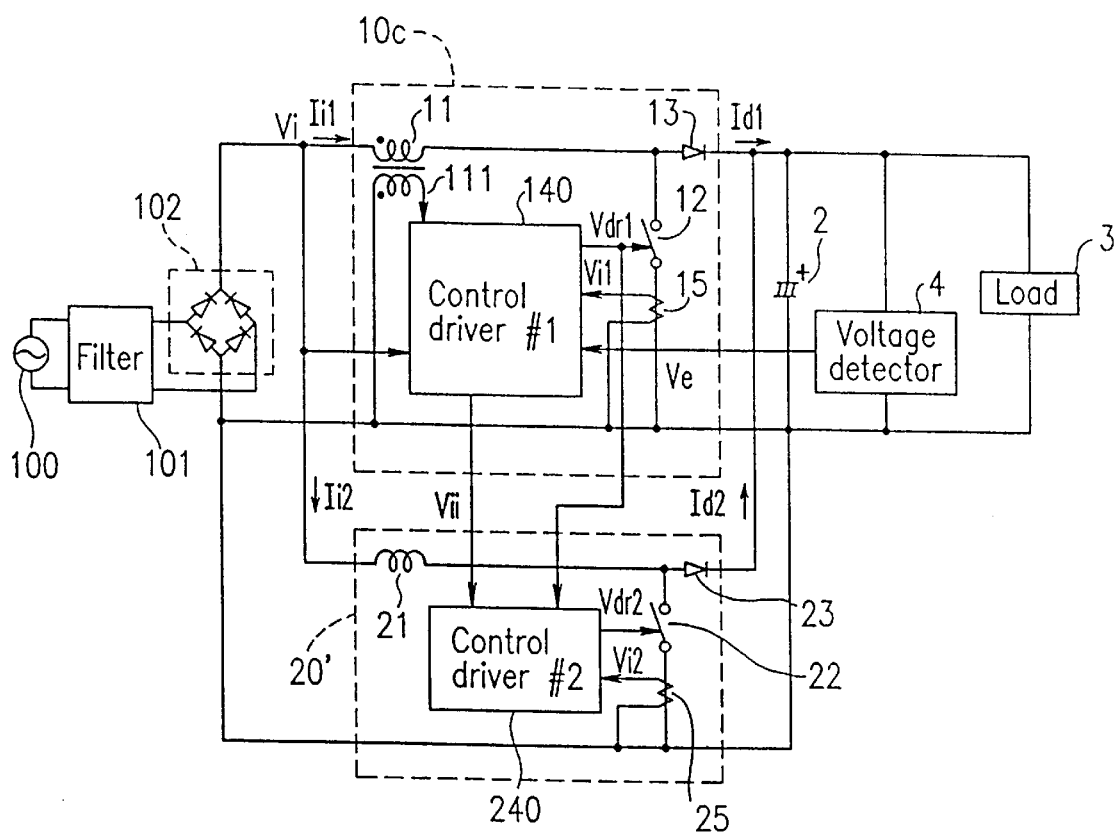
FIG. 15 is a block diagram showing an interleaved switching converter circuit in a fifth example of the present invention.

FIG. 15 shows a circuit configuration of an interleaved switching converter circuit in a fifth example of the present invention. The interleaved switching converter circuit of the fifth example includes two boost converters and functions as a power factor improving converter circuit.

In FIG. 15, the interleaved switching converter circuit includes: an input alternating current (AC) power supply 100; an input filter 101; a bridge diode 102; an output capacitor 2; a load 3; a voltage detector 4; and a first boost converter 10c. The voltage detector 4 detects an output DC voltage applied from the output capacitor 2 to the load 3, and outputs a voltage signal Ve representing the result obtained by comparing the DC voltage with a reference voltage.

The first boost converter 10c includes: a first choke coil 11; a first switch 12; a first diode 13; a first control driver 140; and a first current detector 15. A reset detecting winding 111 is additionally provided for the first choke coil 11 and is connected to the first control driver 140. The first current detector 15 detects the current flowing through the first switch 12, thereby outputting a first current signal Vi1 to the first control driver 140. The first control driver 140 outputs not only the first drive signal Vdr1 for turning ON/OFF the first switch 12, but also a reference current signal Vi1 to be described later.

The interleaved switching converter circuit further includes a second boost converter 20'. The second boost converter 201 includes: a second choke coil 21; a second switch 22; a second diode 23; a second control driver 240; and a second current detector 25. The second current detector 25 detects the current flowing through the second switch 22, thereby outputting a second current signal Vi2 to the second control driver 240. The second control driver 240 outputs the second drive signal Vdr2, thereby turning ON/OFF the second switch 22.

In this fifth example, an AC voltage is supplied from the input AC power supply 100 and a DC voltage is obtained by converting the AC voltage. The power factor is improved by the first and the second control drivers 140 and 240.

Figure 16A:
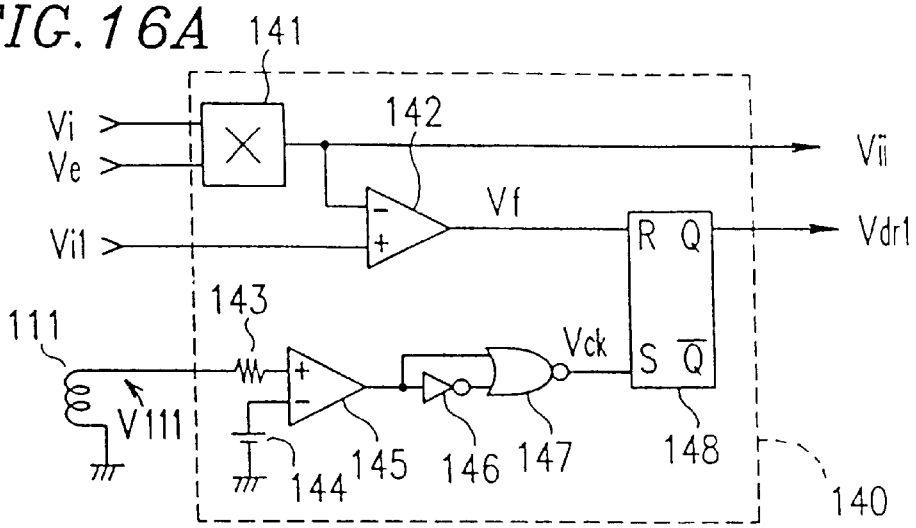
FIGS. 16A and 16B are block diagrams respectively showing the configurations of a first and a second control driver in the interleaved switching converter circuit shown in FIG. 15.
Figure 16B:
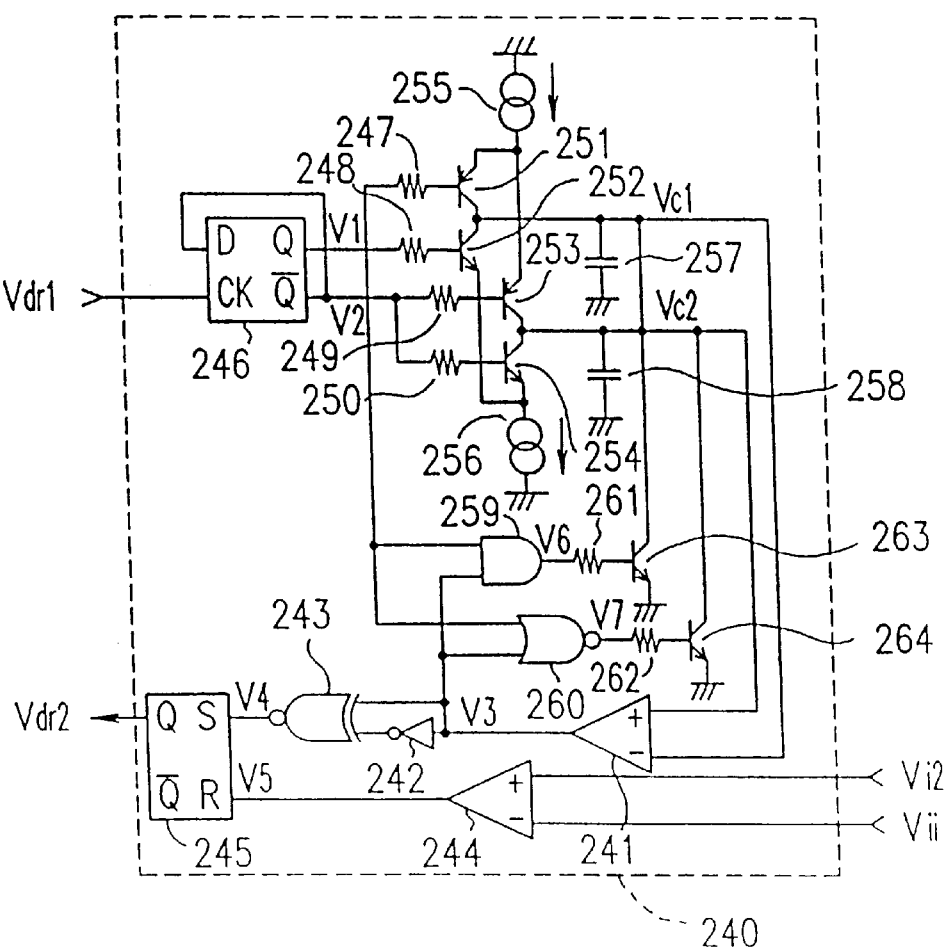

FIGS. 16A and 16B show the configurations of the first and the second control drivers 140 and 240, respectively. FIGS. 17 and 18 show the waveforms of the respective signals in the fifth example First, the operation of the first boost converter 10c will be described with reference to FIG. 16A and FIG. 17. As shown in FIG. 16A, the first control driver 140 includes: a multiplier 141; a first comparator 142; a resistor 143; a voltage source 144; a second comparator 145; an inverter 146; an NOR element 147; and an RS flip-flop 148.

The output of the bridge diode 102, i.e., an input rectified voltage, is assumed to be denoted by Vi. FIG. 17-(a) illustrates the waveform of the first drive signal Vdr1. On the leading edge of the first drive signal Vdr1, the first switch 12 is turned ON, the input rectified voltage Vi is applied to the first choke coil 11 and then linearly increasing current flows. The first switch 12 detects this current, thereby outputting the first current signal Vi1.

The input rectified voltage Vi and the voltage signal Ve are multiplied by the multiplier 141, thereby outputting the reference current signal Vii. The first comparator 142 compares the level of the first current signal Vi1 with that of the reference current signal Vii, and outputs a signal Vf which is activated or rises to the H level when the level of the first current signal Vi1 exceeds the level of the reference current signal Vii, as shown in FIGS. 17-(d) and (e).

The RS flip-flop 148 receives the activated signal Vf at the reset terminal thereof, and deactivates the output thereof, ice., the first drive signal Vdr1. In response thereto, the first switch 12 is turned OFF and the energy stored in the first choke coil 11 is released to the output capacitor 2 via the first diode 13.

A voltage V111 shown in FIG. 17-(b) has been generated in the reset detecting winding 111. The voltage V111 is applied to the second comparator 145 via the resistor 143. The second comparator 145 compares the voltage V111 with the voltage of the voltage source 44. When all the energy stored in the first choke coil 11 has been released and the voltages of the first choke coil 11 and the reset detecting winding 111 are inverted, the level of the output of the second comparator 145 is turned from H to L. The inverter 146 and the NOR element 147 detect the trailing edge, thereby outputting a one-shot pulse Vck as shown in FIG. 17-(c). The RS flip-flop 148 receives the one-shot pulse Vck at the set terminal thereof, and deactivates the output thereof, i.e., the first drive signal Vdr1.

One switching period of the first boost converter 10c repeatedly performing such an operation is sufficiently shorter than one period of the AC voltage supplied from the input AC power supply 100. Thus, the variation of the input rectified voltage Vi during one switching period is negligible. The waveform of the input rectified voltage Vi is illustrated in FIG. 17-(f) in which the time axis has been expanded. On the other hand, if the response frequency of the current detector 4 is set to be sufficiently lower than the input AC frequency, then the voltage signal Ve becomes a DC voltage which is invariable during one period of the AC voltage supplied from the AC power supply 100. That is to say, the reference current signal Vii, obtained by multiplying together the input rectified voltage Vi and the voltage signal Ve, is proportional to the input rectified voltage Vi. The mean value of the input current Ii1 is also proportional to the input rectified voltage Vi. Thus, the first boost converter 10c alone can improve the power factor of the operation in the critical mode. Such a converter enabling the improvement of the power factor in the critical mode can advantageously eliminate diode recovery noise, but the peak value of the input current and the ripple current thereof are disadvantageously large. Accordingly, such a converter alone is unsuitable for applications requiring high power consumption.

Next, the operation of the second boost converter 20' will be described with reference to FIGS. 16B and 18. As shown in FIG. 16B, the second control driver 240 includes: a first comparator 241; an inverter 242; an exclusive-NOR element 243; a second comparator 244; an RS flip-flop 245; a D flip-flop 246; resistors 247 to 250; transistors 251 to 254; constant current sources 255 and 256; a first and a second capacitor 257 and 258; an AND element 259; a NOR element 260; resistors 261 and 262; and transistors 263 and 264. A part of the second control driver 240 including the first comparator 241, the inverter 242, the exclusive-NOR element 243, the second comparator 244 and the RS flip-flop 245 corresponds to the second control driver 24 shown in FIG. 3. On the other hand, a part of the second control driver 240 including the D flip-flop 246, the resistors 247 to 250, the transistors 251 to 254 and the constant current sources 255 and 256 corresponds to the charger/discharger 40 shown in FIG. 3.

FIG. 18-(a) illustrates the waveform of the first drive signal Vdr1, and FIG. 18-(b) illustrates the waveform of the signal V1 of the D flip-flop 246 which is inverted in synchronism with the leading edge of the first drive signal Vdr1. The transistors 251 to 254 are operated in response to the signal V1 and an inverted signal V2 of the signal V1, thereby charging/discharging the first and the second capacitors 257 and 258 as shown in FIG. 18-(c).

The first comparator 241 compares the voltages Vc1 and Vc2 of the first and the second capacitors 257 and 258 with each other, thereby outputting the signal V3, the level of which is inverted at the crossing between these voltages, as shown in FIG. 18-(d). The signals V1 and V3 are input to the AND element 259 and the NOR element 260, which respectively output the signals V6 and V7 as shown in FIGS. 18-(e) and (f). The transistor 263 is turned ON/OFF in response to the signal V6 and quickly discharges the first capacitor 257 such that the voltage Vc1 of the first capacitor 257 drops to the vicinity of zero voltage immediately after the crossing between the voltages Vc1 and Vc2 during discharging of the first capacitor 257. Similarly, the transistor 264 is turned ON/OFF in response to the signal V7 and quickly discharges the second capacitor 258 such that the voltage Vc2 of the second capacitor 258 drops to the vicinity of zero voltage immediately after the crossing between the voltages Vc1 and Vc2 during discharging of the second capacitor 258. Thus, the charging of the first and the second capacitors 257 and 258 is always started from the vicinity of the zero voltage. Assuming the magnitudes of the current supplied from the constant current sources 255 and 256 to be equal to each other, the voltages Vc1 and Vc2 cross each other at a time delayed from the leading edge of the first drive signal Vdr1 by a time interval corresponding to a half switching period.

The inverter 242 and the exclusive-NOR element 243, having an output to be inverted, output a one-shot pulse V4 in synchronism with the inversion of the signal V3 as shown in FIG. 18-(g). The RS flip-flop 245 receives the one-shot pulse V4 at the set terminal thereof, and then activates the output thereof, i.e., the second drive signal Vdr2, thereby turning the second switch 22 ON. When the second switch 22 is turned ON, the input rectified voltage Vi is applied to the second choke coil 21 and current linearly increasing from the zero voltage flows. This current is detected by the second current detector 25, thereby outputting the second current signal Vi2. The level of the second current signal Vi2 is compared with that of the reference current signal Vii by the second comparator 244 as shown in FIGS. 28-(h) and (i). When the level of the second current signal Vi2 exceeds the level of the reference current signal Vii, the output signal V5 of the second comparator 244 is activated, i.e., rises to the H level. The RS flip-flop 245 receives the activated signal V5 at the reset terminal thereof, and deactivates the output thereof, i.e., the second drive signal Vdr2. FIG. 18-(j) illustrates the waveform of the second drive signal Vdr2. When the second drive signal Vdr2 is deactivated, the second switch 22 is turned OFF and the energy stored in the second choke coil 21 is released to the output capacitor 2 via the second diode 23.

The peak values of the current flowing through the first and the second choke coils 11 and 21 follow the same reference current signal Vii. Thus, if the inductance value of the second choke coil 21 is equal to or lower than the inductance value of the first choke coil 11, the energy stored in the second choke coil 21 becomes equal to or lower than the energy stored in the first choke coil 11. Therefore, when the second drive signal Vdr2 is activated again after the first drive signal Vdr1 was activated and the above-described operation has been repeated, all the energy stored in the second choke coil 21 has already been released. Consequently, the second boost converter 20' operates with substantially the same switching period and duty ratio as those of the first boost converter 10c so as to be delayed by a half switching period. The waveforms of the input current Ii1 and Ii2 of the first and the second boost converters 10c and 20' are as shown in FIG. 18-(k) in which the time axis has been expanded. The input current Ii (=Ii1+Ii2) flowing through the bridge diode 102 has a current waveform with a reduced ripple as shown in FIG. 18-(l).

EXAMPLE 6

The interleaved switching converter circuit in the foregoing first to fifth examples of the present invention determines the activation point of the drive signal of the second boost converter by comparing the voltages of a pair of capacitors to be repeatedly charged and discharged in synchronism with the leading edge of the drive signal of the first boost converter.

This operational principle can be simply interpreted as follows. That is to say, it can be considered that the interleaved switching converter circuit of the present invention utilizes the period of the drive signal of the first boost converter which is stored as a charge voltage of a capacitor in determining the activation point of the drive signal of the second boost converter.

The interleaved switching converter circuit in a sixth example of the present invention is devised based on such a point of view.

Figure 19:
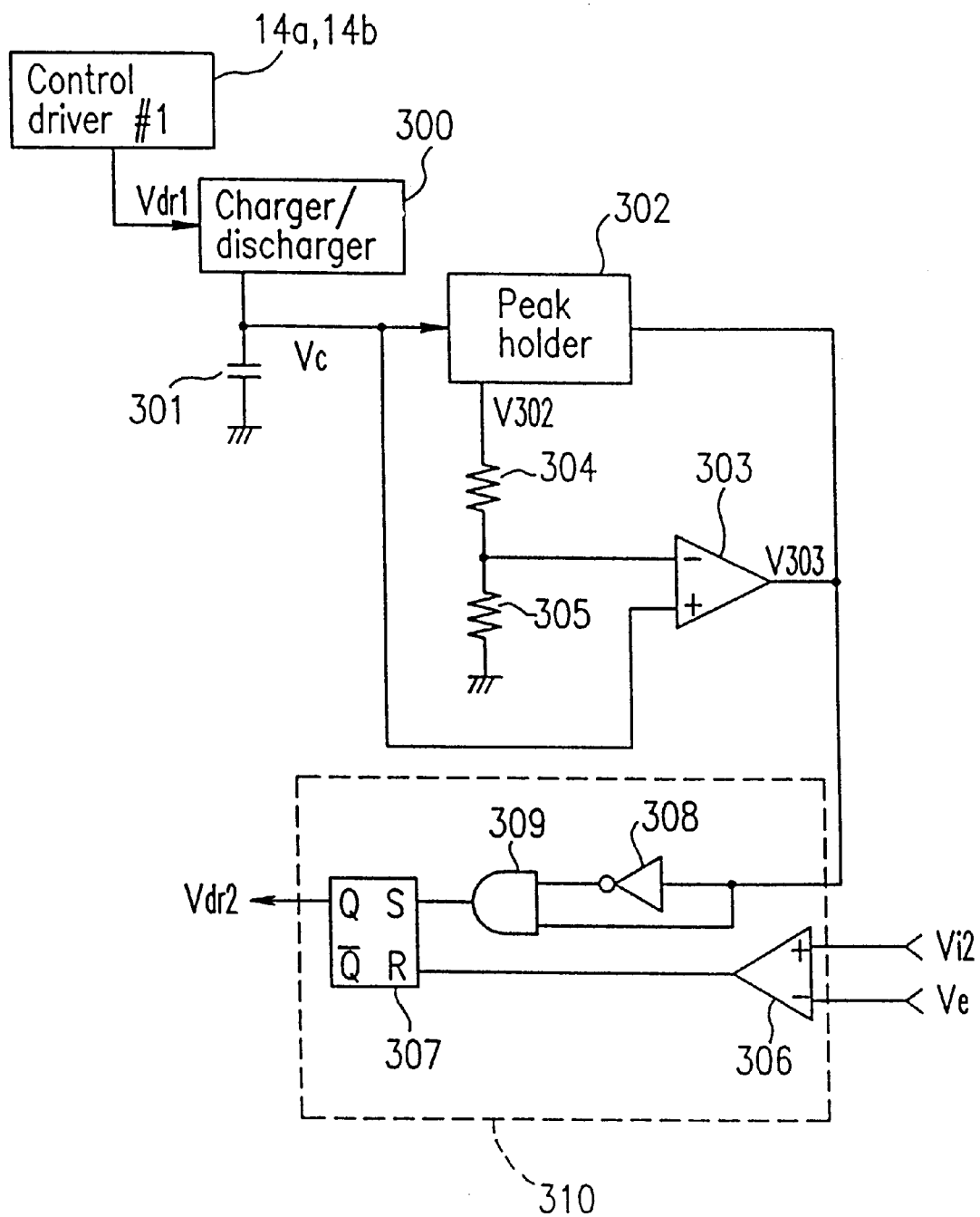
FIG. 19 is a block diagram showing the configurations of the circuit sections including a charger/discharger, a peak holder, a comparator and a second control driver in an interleaved switching converter circuit in a sixth example of the present invention.

FIG. 19 shows the interleaved switching converter circuit in the sixth example of the present invention. The interleaved switching converter circuit includes: a charger/discharger 300; a peak holder 302; a first comparator 303; and a second control driver 310. The charger/discharger 300 and the second control driver 310 are substituted for the charger/discharger 40 and the second control driver 24, respectively, shown in FIGS. 1 and 8.

In response to the first drive signal Vdr1 supplied from the first control driver 14a or 14b, the charger/discharger 300 charges/discharges a capacitor 301. The peak holder 302 holds a peak value Ec of a voltage Vc of the capacitor 301, and outputs a signal V302 representing the peak value Ec. The peak value Ec is subjected to a resistance division by resistors 304 and 305, so that a voltage αEc is applied to the first comparator 303. The first comparator 303 compares the voltage αEc with the voltage Vc of the capacitor 301. If Vc is larger than αEc, the first comparator 303 sets an output signal V303 at the H level. On the other hand, if Vc is smaller than αEc, the first comparator 303 switches the output signal V303 into the L level. When the output signal V303 of the first comparator 303 is inverted from L into H, the peak holder 302 is reset. The second control driver 310 includes: an inverter 308; an AND element 309; a second comparator 306; and an RS flip-flop 307.

FIG. 20 illustrates the waveforms of the respective signals in the circuit shown in FIG. 19. The charger/discharger 300 receives the first drive signal Vdr1 such as that shown in FIG. 20-(a), quickly discharges the capacitor 301 to the vicinity of the zero voltage in synchronism with the leading edge of the first drive signal Vdr1, and then charges the capacitor 301 with constant current. Thereafter, the charger/discharger 300 repeatedly performs such a charging/discharging operation. As a result, the voltage Vc of the capacitor Vc is varied as indicated by the solid line in FIG. 20-(b). The peak holder 302 receives the voltage Vc of the capacitor 301, thereby outputting the signal V302 representing the peak value Ec as shown in FIG. 20-(c). When the signal V303 supplied from the first comparator 303 is inverted from L into H as shown in FIG. 20-(d), the peak holder 302 is reset as shown in FIG. 20-(c). The inverter 308 and the AND element 309 outputs a one-shot pulse to the set terminal of the RS flip-flop 307 in synchronism with the leading edge of the signal V303 supplied from the first comparator 303, thereby activating the second drive signal Vdr2. On the other hand, when the level of the second current signal Vi2 supplied from the second current detector 25 exceeds the level of the voltage signal Ve supplied from the voltage detector 4, the second comparator 306 supplies the activated H signal to the reset terminal of the RS flip-flop 307, thereby resetting the RS flip-flop 307 and deactivating the second drive signal Vdr2.

By repeatedly performing the above-described operation, the second boost converter 20 can be operated so as to be delayed by a phase difference α-time as short as one switching period as compared with the operation of the first boost converter 10a or 10b.

In the foregoing description, an interleaved switching converter circuit including a plurality of boost converters has been illustrated. Alternatively, the interleaved switching converter circuit of the present invention may also be implemented by using a plurality of switching converters of a different type, instead of the boost converters.

As is apparent from the foregoing description, the present invention can provide an interleaved switching converter circuit which can be operated with an arbitrary phase difference and a variable switching period by performing a simplified control. In particular, if the interleaved switching converter circuit of the present invention is configured so as to be operated in a critical mode, the disadvantages typical of the mode (i.e., since the input/output ripple is large, this mode is unsuitable for applications consuming a large amount of power) can be overcome, while taking advantage of the elimination of diode recovery noise which is characteristic of the critical mode. Such effects of the present invention are also suitably applicable to a power factor improving converter circuit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An interleaved switching converter circuit comprising:
   a first and a second switching converter which are connected in parallel to each other;
   a first control driver for turning ON/OFF the first switching converter;
   a charger/discharger having a first and a second capacitor and alternately charging/discharging the first and the second capacitors, in response to the turn ON/OFF of the first switching converter; and
   a second control driver for turning ON/OFF the second switching converter in synchronism with an inversion of a difference between voltages of the first and the second capacitors.

2. An interleaved switching converter circuit comprising:
   a first and a second switching converter which are connected in parallel to each other;
   a first control driver generating a first drive signal for driving a switch of the first switching converter;

a charger/discharger having a first and a second capacitor, receiving the first drive signal, and alternately charging/discharging the first and the second capacitors in synchronism with the first drive signal; and a second control driver generating a second drive signal for driving a switch of the second switching converter, wherein the second control driver receives voltages of the first and the second capacitors and generates the second drive signal in synchronism with an inversion of a difference between the voltages of the first and the second capacitors.

3. An interleaved switching converter circuit according to claim 2, wherein the first switching converter is a switching converter operating in a critical mode in which current flows through a choke coil in a boundary mode between a continuous mode and a discontinuous mode.

4. An interleaved switching converter circuit according to claim 2, wherein each of the first and the second capacitors is discharged to a zero voltage or to the vicinity thereof within a period after the inversion of the voltage difference between the first and the second capacitors has been detected and before charging of each said capacitor is started.

5. An interleaved switching converter circuit comprising:

a number N (where N is a natural number equal to or larger than 2) of switching converters which are connected in parallel to each other;

a k-th (where k is also a natural number and $1 \leq k < N$) control driver generating a k-th drive signal for driving a switch of a k-th switching converter;

a charger/discharger having a first and a second capacitor, receiving the k-th drive signal, and alternately charging/discharging the first and the second capacitors in synchronism with the k-th drive signal; and a (k+1)-th control driver generating a (k+1)th drive signal for driving a switch of a (k+1)-th switching converter, wherein the (k+1)-th control driver receives voltages of the first and the second capacitors and generates the (k+1)-th drive signal in synchronism with an inversion of a difference between the voltages of the first and the second capacitors.

6. An interleaved switching converter circuit according to claim 5, wherein a level of current discharged by the charger/discharger is about (N/n−1) (where n is a natural number smaller than N and is prime with respect to N) times as high as a level of current charged by the charger/discharger at least until the difference between the voltages of the first and the second capacitors is inverted.

7. An interleaved switching converter circuit according to claim 5, wherein a level of current discharged by the charger/discharger is about (N/n−1) (where n is a natural number equal to or smaller than N/2) times as high as a level of current charged by the charger/discharger at least until the difference between the voltages of the first and the second capacitors is inverted.

8. An interleaved switching converter circuit comprising a number N (where N is an integer equal to or larger than 2) of switching converters which are connected in parallel to each other, a voltage detector for detecting an output voltage of the interleaved switching converter circuit, thereby outputting a voltage signal, an alternating current input voltage being rectified and input to each of the number N of switching converters, each said switching converter applying a direct current output voltage to a load, wherein a first switching converter includes: a first switch; a first current detector for detecting current flowing across the first switch, thereby outputting a first current signal; and a first control driver for outputting a first drive signal having a predetermined duty ratio, thereby driving the first switch, and wherein the first control driver determines and outputs a reference current signal from the rectified alternating current input voltage and from the voltage signal, and compares the first current signal with the reference current signal, thereby determining the duty ratio of the first drive signal, and wherein a k-th (where $1 < k \leq N$) switching converter includes: a k-th switch; a k-th current detector for detecting current flowing across the k-th switch, thereby outputting a k-th current signal; and a k-th control driver for outputting the k-th drive signal, thereby driving the k-th switch, and wherein the k-th control driver has a first and second capacitor, detects a (k−1)-th drive signal of a (k−1)-th switching converter, alternately charges/discharges the first and the second capacitors in synchronism with a leading edge of the (k−1)-th drive signal, activates the k-th drive signal in synchronism with an inversion of a difference between the voltages of the first and the second capacitors, and compares the k-th current signal with the reference current signal, thereby determining a duty ratio of the k-th drive signal.

9. A switching converter controlling method, wherein two capacitors are alternately charged/discharged in response to a turn ON/OFF of a first switching converter, and a second switching converter is turned ON/OFF by comparing voltages of the two capacitors with each other.

10. A switching converter controlling method, wherein a period of a drive signal of a first switching converter is stored as a charge voltage for a capacitor, and a period of a drive signal of a second switching converter is determined based on the charge voltage of the capacitor.

* * * * *